United States Patent
Suzuki et al.

(10) Patent No.: US 8,781,686 B2
(45) Date of Patent: Jul. 15, 2014

(54) DEVICE/METHOD FOR CONTROLLING TURNING BEHAVIOR OF VEHICLE

(75) Inventors: Tatsuya Suzuki, Yokohama (JP); Motoaki Hosaka, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 772 days.

(21) Appl. No.: 12/990,879

(22) PCT Filed: Apr. 16, 2009

(86) PCT No.: PCT/JP2009/057645
§ 371 (c)(1),
(2), (4) Date: Nov. 3, 2010

(87) PCT Pub. No.: WO2009/142079
PCT Pub. Date: Nov. 26, 2009

(65) Prior Publication Data
US 2011/0060505 A1    Mar. 10, 2011

(30) Foreign Application Priority Data

May 19, 2008 (JP) ................................. 2008-130332
Mar. 4, 2009 (JP) ................................. 2009-050235

(51) Int. Cl.
*A01B 69/00* (2006.01)
*B62D 6/00* (2006.01)
*B62D 11/00* (2006.01)
*B62D 12/00* (2006.01)

(52) U.S. Cl.
USPC ................................. 701/42; 701/70; 701/72

(58) Field of Classification Search
USPC ............ 701/16, 301, 31.4, 38, 41, 42, 44, 48, 701/65, 70, 72, 93, 96; 180/179, 248, 405, 180/443, 446, 65.23; 280/5.503, 6.15; 303/140, 146, 193; 477/107, 110, 169
See application file for complete search history.

(56) References Cited

U.S. PATENT DOCUMENTS

| | | | |
|---|---|---|---|
| 6,504,473 B2 | 1/2003 | Ichikawa et al. | |
| 6,528,959 B2 * | 3/2003 | Kitano et al. | 318/55 |
| 6,843,538 B1 * | 1/2005 | Nagae et al. | 303/146 |
| 7,363,134 B2 * | 4/2008 | Mitsuhara | 701/42 |
| 7,805,234 B2 | 9/2010 | Ishimoto | |
| 2005/0269874 A1 * | 12/2005 | Ishimoto | 303/146 |

FOREIGN PATENT DOCUMENTS

| | | |
|---|---|---|
| CN | 1781784 A | 6/2006 |
| EP | 1174731 A2 | 1/2002 |
| JP | 11-11272 A | 1/1999 |
| JP | 2000-168526 A | 6/2000 |
| JP | 2005-145143 A | 6/2005 |
| JP | 2007-76464 A | 3/2007 |
| JP | 2008044520 A * | 2/2008 |

* cited by examiner

Primary Examiner — Tuan C. To
Assistant Examiner — Isaac Smith
(74) Attorney, Agent, or Firm — Foley & Lardner LLP

(57) ABSTRACT

A vehicle turning behavior control apparatus comprises a controlling section which limits a turning behavior of a vehicle caused by a steering operation, to a limit behavior corresponding to an actual steering speed, by a vehicle speed decrease. The controlling section is configured to determine a modified steering speed in accordance with the actual steering speed, and to determine the limit behavior in accordance with the modified steering speed. The controlling section is further configured to make the modified steering speed higher than the actual steering speed when the actual steering speed decreases during a turning steering for increasing a steering amount. For example, the actual steering speed is used directly as the modified steering speed while the actual steering speed during the turning steering is increasing. While the actual steering speed during the turning steering is decreasing, the modified steering speed higher than the actual steering speed is used.

20 Claims, 13 Drawing Sheets

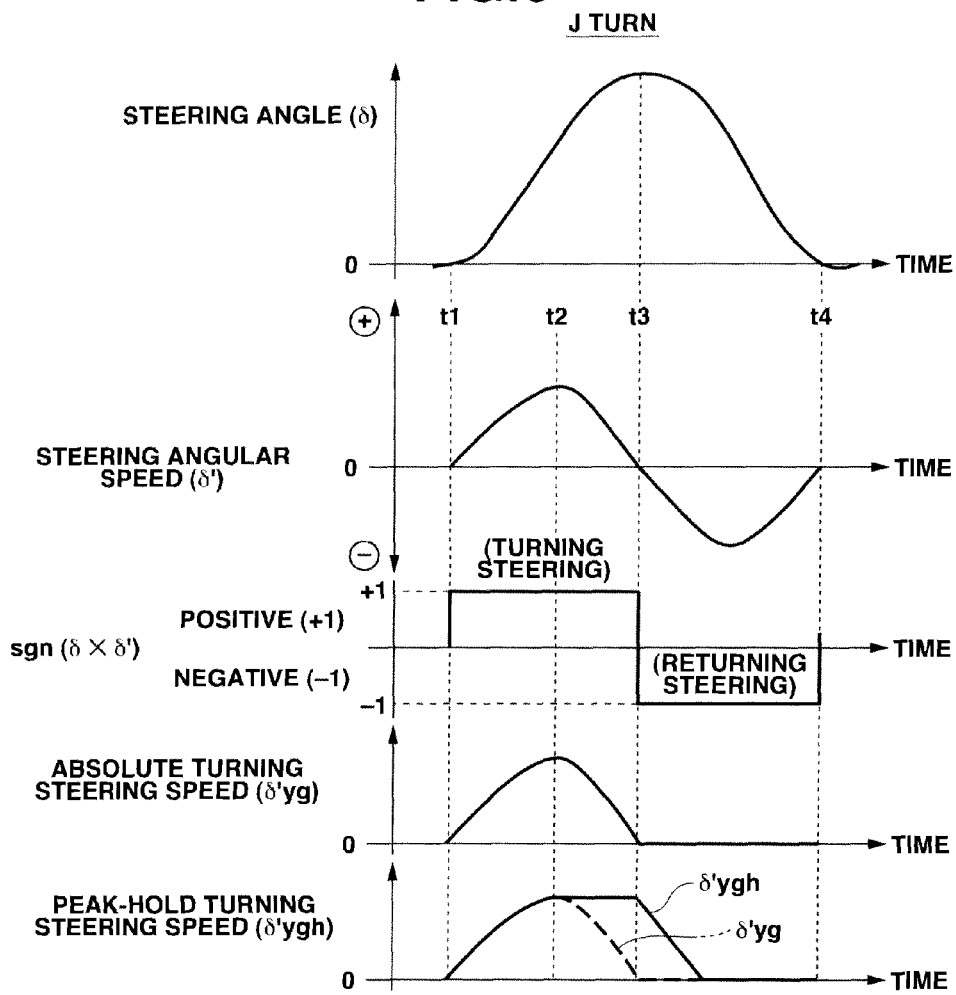
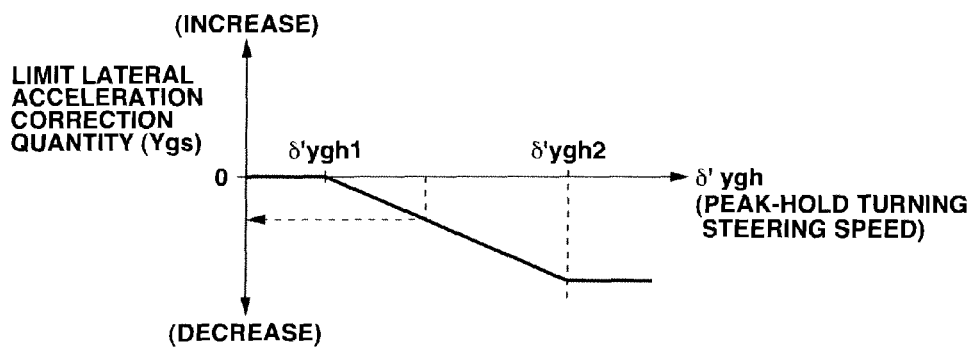

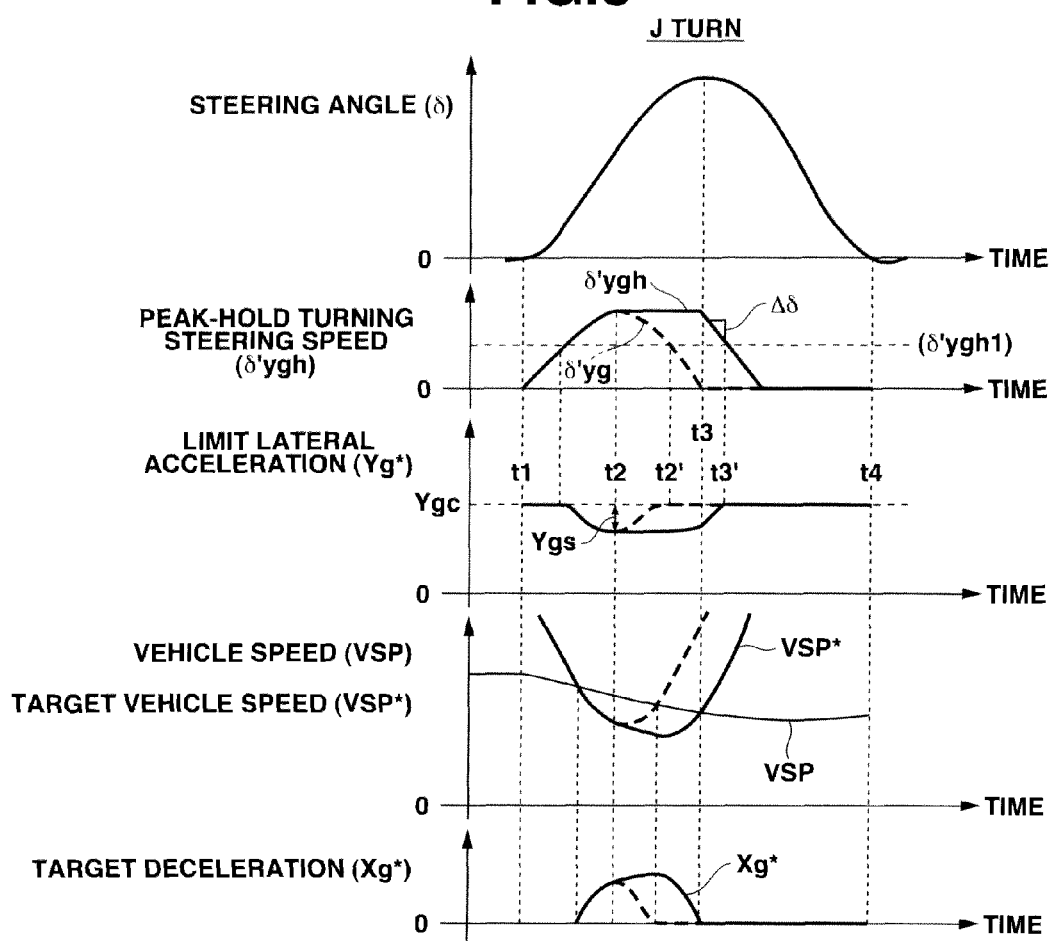
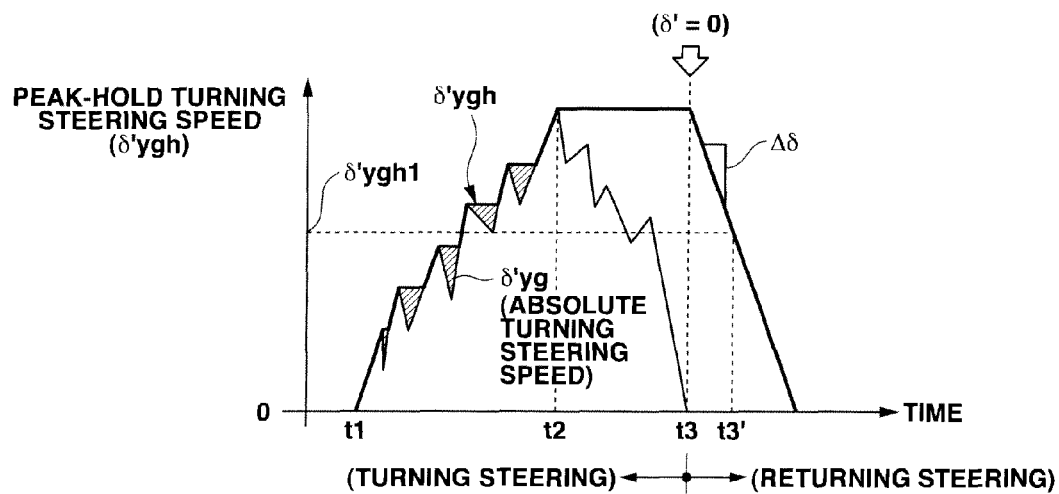

DEVICE/METHOD FOR CONTROLLING TURNING BEHAVIOR OF VEHICLE

TECHNICAL FIELD

The present invention relates to vehicle turning behavior control apparatus or device and/or method or process arranged to limit a vehicle turning behavior due to steering, to a limit behavior corresponding to a steering speed, by a decrease of a vehicle speed.

BACKGROUND ART

Patent document 1 shows a known turning behavior control system of such a type.

The gist of this turning behavior control system is as follows. When a driver's steering speed is rapid beyond a preset speed, the control system decreases the vehicle speed to a target vehicle speed (bringing the deceleration to a target deceleration) by decreasing the target vehicle speed (increasing the target deceleration), and thereby prevents the vehicle turning behavior due to the steering from exceeding a limit behavior corresponding to the steering speed.

In case of a rapid steering to change lanes for emergency avoidance, for example, the turning behavior control system of such a type can limit the vehicle turning behavior determined in connection with the steering and the vehicle speed, to the limit behavior dependent on the steering speed, by decreasing the vehicle speed (increasing the deceleration). Consequently, the control system can prevent a great turning behavior of the vehicle even if a deceleration by the driver is deficient or delayed, so that the control system is advantageous for safety.

PRIOR ART LITERATURE

Patent Document 1: JP2005-145143 A

SUMMARY OF THE INVENTION

Problem to be Solved by the Invention

However, the above-mentioned turning behavior control system is arranged to control the vehicle driving/braking force to decrease the vehicle speed toward the target vehicle speed (to bring the vehicle deceleration to the target deceleration) in the case of a rapid steering with a steering speed exceeding the preset speed. Therefore, when the steering speed decreases to the preset value just before the instant at which a turning steering in a turning direction for producing the turning behavior ends and a returning steering in the opposite direction starts, then the target vehicle speed starts increasing from the decreased level (the target deceleration starts decreasing from the increased level) while the turning steering is still in progress, and the control system controls the vehicle driving/braking force so as to increase the vehicle speed before the end of the turning steering. As a result, the driving/braking force control causes the vehicle speed to vary uncomfortably and unnaturally.

It is an object of the present invention to provide a vehicle turning behavior control apparatus which, in limiting the turning behavior at the time of rapid steering to the limit behavior, eliminates unnatural feeling caused by the vehicle speed increased by an end of the limitation during the turning steering.

Means for Solving the Problem

For this object, a vehicle turning behavior control apparatus according to one aspect of the present invention is basically configured to limit a turning behavior of a vehicle due to a steering operation to a limit behavior corresponding to a steering speed, by a vehicle speed decrease, and further configured to use, as a steering speed used for determining the limit behavior, the steering speed directly while the steering speed is increasing during the turning steering for causing the turning behavior, and to use a higher steering speed higher than the steering speed while the steering speed is decreasing during the turning steering, and to continue such a selective use of the steering speed at least until a start of a returning steering for decreasing the steering amount.

According to another aspect of the present invention, a vehicle turning behavior control apparatus comprises a controlling section to limit a turning behavior of a vehicle caused by a steering operation, to a limit behavior corresponding to an actual steering speed, by a vehicle speed decrease. The controlling section is configured to determine a modified steering speed in accordance with the actual steering speed, and to determine (or modify) the limit behavior in accordance with the modified steering speed. The controlling section is further configured to set the modified steering speed higher than the actual steering speed when the actual steering speed decreases during a turning steering in a direction for increasing a steering amount.

According to still another aspect of the present invention, a vehicle turning behavior control apparatus comprises a controlling section which is configured to determine an actual steering speed, to determine a limit behavior dependent on the actual steering speed, to produce a control signal in accordance with the limit behavior, to decreases a vehicle speed by controlling the vehicle speed in accordance with the control signal, and thereby to limit a vehicle turning behavior to the limit behavior. The controlling section is further configured to determine a modified steering speed in accordance with the actual steering speed, and to produce the control signal in accordance with the modified steering speed. The controlling section is further configure to set the modified steering speed higher than the actual steering speed when the actual steering speed decreases during a turning steering in a steering amount increasing direction.

BRIEF DESCRIPTION OF THE DRAWINGS

FIG. 6 is a time chart of operations when the turning behavior control of FIG. 2 determines a peak-hold turning steering speed in the case of a J-turn of the vehicle.

FIG. 7 is a characteristic view showing variation of a limit lateral acceleration correction quantity.

FIG. 8 is a time chart showing operations when the turning behavior control of FIG. 2 determines a limit lateral acceleration, a target vehicle speed and a target deceleration in the case of the J-turn of the vehicle.

FIG. 9 is a time chart showing, in close-up, a time variation of the peak-hold turning steering speed shown in FIG. 8.

MODES FOR CARRYING OUT THE INVENTION

Modes of the present invention are explained hereinafter in detail with reference to illustrated embodiments.

Embodiment 1

Figure 1:
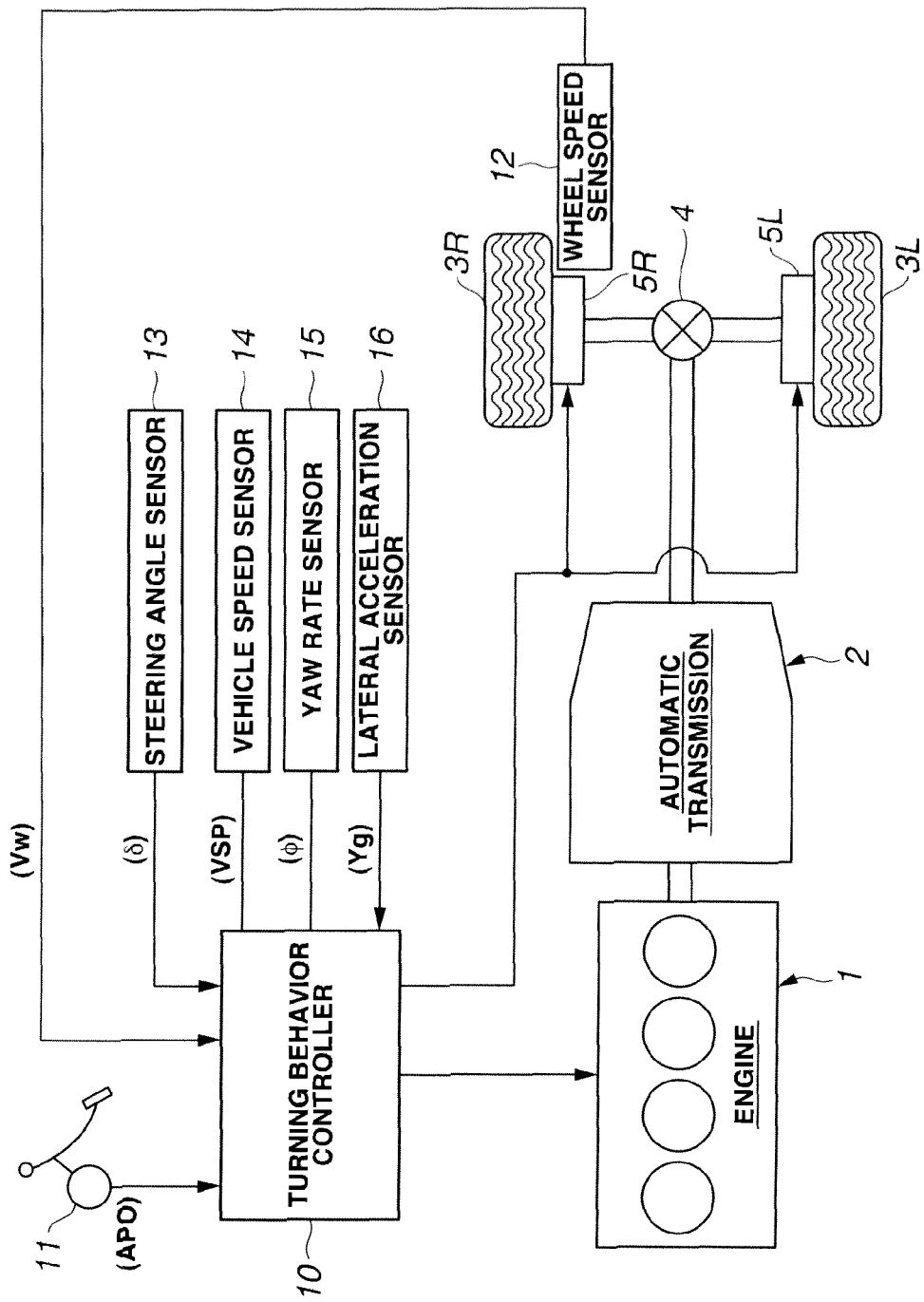
FIG. 1 is a schematic diagram showing a power train of a front engine, rear wheel drive vehicle equipped with a vehicle turning behavior control apparatus according to a first embodiment of the present invention, together with the control system.

FIG. 1 shows a power train of a front engine, rear wheel drive vehicle equipped with a vehicle turning behavior control apparatus according to a first embodiment of the present invention, together with the vehicle turning behavior control apparatus. The vehicle shown in FIG. 1 includes an engine 1, an automatic transmission 2, left and right drive wheels (rear wheels) 3L and 3R, and a differential gear device 4.

Automatic transmission 2 is a commonly-used automatic transmission having therein an ordinary speed change gear mechanism, which can output rotation from engine 1 at a rotational speed changed in dependence on a selected speed or gear position. The output rotation from automatic transmission 2 is transmitted through the differential gear device 4, to the left and right drive wheels 3L and 3R, to drive the vehicle.

At the time of deceleration or stoppage of the vehicle, brake actuators (brake units) 5L and 5R serving as automatic braking means, too, are actuated to brake the wheels 3L and 3R, to decelerate the vehicle and to stop the vehicle.

At the time of vehicle turning behavior control, the turning behavior controller 10 performs the turning behavior control by controlling driving forces of wheels 3L and 3R with engine 1, and braking forces of wheels 3L and 3R with brake actuators 5L and 5R, as mentioned later. Turning behavior controller 10 functions as a main component of a controlling section or control section of the vehicle turning behavior control system.

Therefore, the turning behavior controller 10 receives, as inputs, a signal from an accelerator opening sensor 11 for sensing an accelerator pedal depression degree (accelerator opening degree) APO, a signal from a wheel speed sensor or sensors 12 for sensing a wheel speed Vw, a signal from a steering angle sensor 13 for sensing an angle δ of a steering wheel, a signal from a vehicle speed sensor 14 for sensing a vehicle speed VSP which is a ground speed of the vehicle, a signal from a yaw rate sensor 15 for sensing a yaw rate φ (actual yaw rate phi) about a vertical axis passing through the center of gravity of the vehicle (having a polarity corresponding to the direction of the yaw rate), and a signal from a lateral acceleration sensor 16 for sensing a lateral acceleration Yg acting on the vehicle. The vehicle turning behavior control system includes a sensing section. In the illustrated example, the sensing section includes the sensors shown in FIG. 1, and supplies input information collected with these sensors, to the controlling section.

Figure 2:
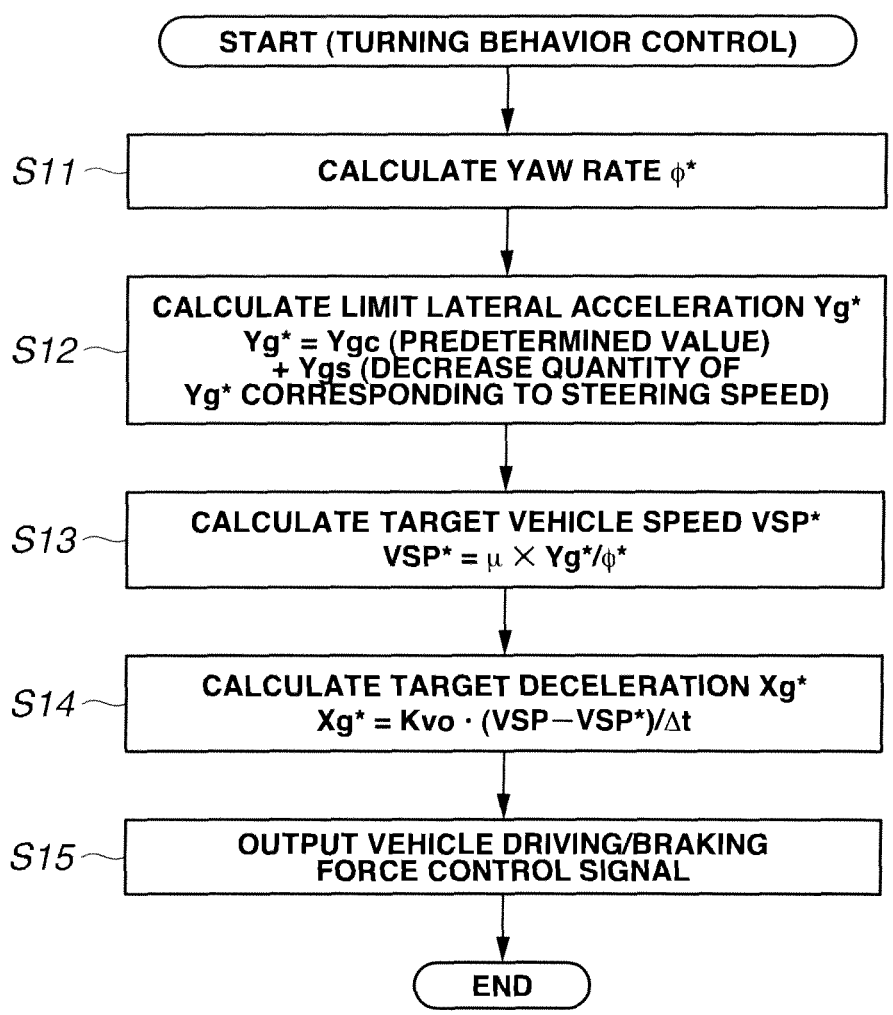
FIG. 2 is a flowchart showing a program of a turning behavior control process performed by a turning behavior controller shown in FIG. 1.

The turning behavior controller 10 performs a control program shown in FIG. 2 repeatedly at regular intervals of a constant period, and thereby performs the vehicle turning behavior control of this embodiment in a following manner. FIG. 2 shows the turning behavior control process according to this embodiment.

Figure 3:
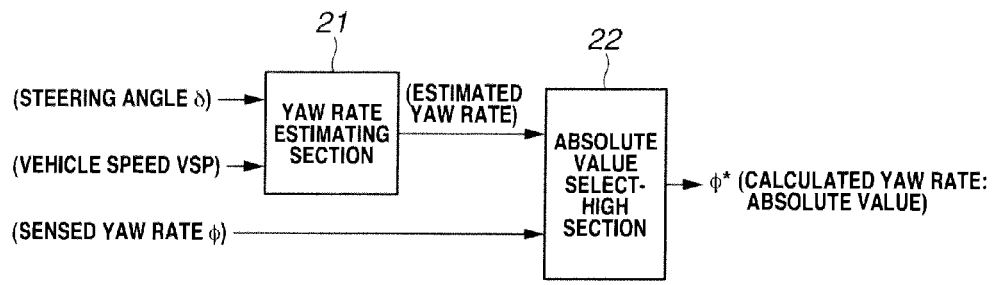
FIG. 3 is a view illustrating a process of calculating a calculated yaw rate determined in FIG. 2.

At a step S11, the controller calculate a vehicle yaw rate φ* (phi asterisk) according to a method shown in a block diagram of FIG. 3.

A yaw rate estimating section 21 shown in FIG. 3 estimates a vehicle yaw rate (having a polarity depending on the direction of the yaw rate), from steering angle δ sensed by sensor 13 and vehicle speed VSP sensed by sensor 14, by search or lookup from predetermined map or by solving equations of vehicle motion.

An absolute value select high section 22 compares an absolute value of the estimated yaw rate (an estimated value of the yaw rate)(having the polarity depending on the yaw rate direction) from the yaw rate estimating section 21 and an absolute value of the sensed yaw rate φ (a value of the actual yaw rate) (having the polarity depending on the yaw rate direction) sensed by sensor 15 with each other, and sets a greater one of the absolute values of the estimated and sensed yaw rates, as a calculated yaw rate φ* (a calculated value of the yaw rate). In this embodiment, the controlling section includes a yaw rate calculating section, which determines a calculated yaw rate by comparing an actual yaw rate obtained by sensing and an estimated yaw rate obtained by calculation. In this example, the yaw rate calculating section includes the yaw rate estimating section 21 and the absolute value select high section 22.

At a step S12 after calculating the vehicle yaw rate φ* (phi asterisk) at S11, the controller calculates a value of a limit lateral acceleration Yg* (limit lateral acceleration Yg asterisk) corresponding to a limit behavior of this embodiment, by calculation according to a following equation.

$$Yg^* = Ygc + Ygs$$

In this equation,

Ygc: predetermined value (constant, 0.45 G, for example)

Ygs: limit correction quantity. The limit correction quantity is a limit lateral acceleration decrease quantity (negative value) which becomes greater as the time rate of change of steering angle δ (delta) is faster.

Therefore, the limit lateral acceleration $Yg^*$ (Yg asterisk) of the left side of the above mathematical expression varies in dependence on the time rate of change of steering angle δ (steering speed), and decreases as the time rate of change of steering angle δ is faster. The limit lateral acceleration $Yg^*$ (limit behavior) and the decrease quantity Ygs of the limit lateral acceleration depending on the time rate of change of steering angle δ (steering speed) will be explained more in detail later. In this embodiment, a state quantity or state variable representing a vehicle turning behavior or a vehicle turning motion variable is the lateral acceleration, and a limit turning motion variable is the limit lateral acceleration $Yg^*$. Moreover, the limit correction quantity (limit decrease quantity) for decreasing the limit turning motion variable is the limit lateral acceleration decrease quantity Ygs.

At a next step S13, the controller calculates a target vehicle speed VSP* (VSP asterisk) such that the lateral acceleration Yg applied to the vehicle is not increased beyond the limit lateral acceleration $Yg^*$ even by the yaw rate φ* (phi asterisk) produced by the time rate of change of steering angle δ (steering speed).

Figure 4:
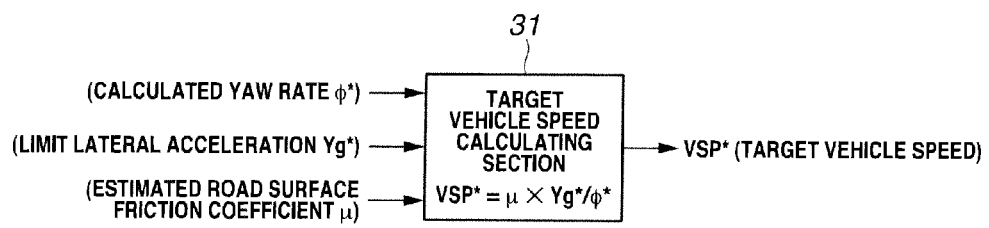
FIG. 4 is a view illustrating a process of calculating a target vehicle speed determined in FIG. 2.

In this calculation, a target vehicle speed calculating section 31 (included in the controlling section) shown in FIG. 4 calculates the target vehicle speed VSP*, from the calculated yaw rate φ*, limit lateral acceleration $Yg^*$, and a road surface friction coefficient μ (mu), according to a following equation.

$$VSP^* = \mu \times Yg^* / \phi^*$$

Thus, target vehicle speed VSP* (VSP asterisk) is obtained by multiplying the quotient obtained by dividing limit lateral acceleration $Yg^*$ (Yg asterisk) by the calculated yaw rate φ* (phi asterisk), by road surface friction coefficient μ (mu).

The road surface friction coefficient μ is determined by determining a wheel slip rate from the wheel speed Vw sensed by sensor 12 and vehicle speed VSP sensed by sensor 14, determining a wheel driving force from the accelerator opening degree APO sensed by sensor 11 and vehicle speed VSP sensed by sensor 14, and estimating the road surface friction coefficient μ from the thus-calculated wheel slip rate and wheel driving force.

Figure 5:
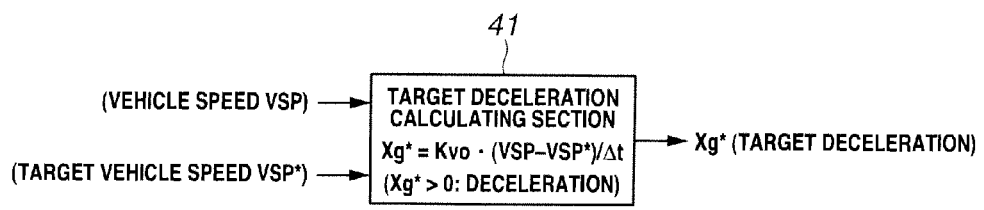
FIG. 5 is a view illustrating a process of calculating a target deceleration determined in FIG. 2

At a next step S14, a target deceleration calculating section 41 (included in the controlling section) shown in FIG. 5 calculates a target deceleration Xg* according to a following equation using the (actual) vehicle speed VSP and target vehicle speed VSP*.

$$Xg^* = Kvo \times (VSP - VSP^*) / \Delta t$$

Kvo: predetermined gain

Δt (delta t): predetermined time (amount of time) until the vehicle speed VSP is made equal to target vehicle speed VSP*. Therefore, the target deceleration Xg* is a vehicle deceleration required to bring the vehicle speed VSP to target vehicle speed VSP* over a period of predetermined time Δt. As known from the above equation, the condition of Xg*>0 means deceleration. Thus, target deceleration Xg* (Xg asterisk) is obtained by multiplication of gain Kvo and the quotient obtained by dividing the difference (VSP−VSP*) resulting from subtraction of target vehicle speed VSP* (VSP asterisk) from actual vehicle speed VSP, by predetermined time Δt (delta t).

At a next step S15, the controller realizes the target deceleration Xg* by outputting the driving/braking force control signals to brake actuators 5L and 5R and engine 1 as shown in FIG. 1 to bring the vehicle deceleration (actual deceleration) to the target deceleration Xg*, and accomplishes the control to bring the vehicle speed VSP toward the target vehicle speed VSP* under the condition of this deceleration.

By this control (vehicle speed decrease control), the control system can decrease vehicle speed VSP to target vehicle speed VSP* under target deceleration Xg* so as to prevent the lateral acceleration Yg as the vehicle turning behavior from exceeding the limit lateral acceleration $Yg^*$ as the limit behavior when the yaw rate φ* is produced due to the time rate of change of steering angle δ (actual steering speed).

Therefore, even in the case of a rapid steering operation in order to change lanes for emergency avoidance etc., the control system can limit the lateral acceleration Yg (vehicle turning behavior) determined in relation to the aforementioned steering operation and the vehicle speed, to the limit lateral acceleration $Yg^*$ (limit behavior) corresponding to the steering speed, by the aforementioned vehicle speed decrease (increase of the deceleration), to great advantage for safety.

The following is explanation on the limit lateral acceleration $Yg^*$ corresponding to the limit behavior of this embodiment explained for S12, and the limit lateral acceleration decrease quantity Ygs corresponding to the time rate of change of steering angle δ (steering speed), used for calculating the limit lateral acceleration $Yg^*$ according to the aforementioned equation (Yg*=Ygc+Ygs), with reference to FIGS. 6~8.

FIGS. 6 and 7 are time charts in the case of a J turn cornering operation starting to increase the steering angle δ as shown, at an instant t1 from the straight traveling state with the steering angle held at zero, then decreasing the steering angle δ from an instant t3 as shown and returning steering angle δ to zero at an instant t4.

When steering angle δ is varied in this way, over time or in a manner of time series, the steering angular speed (steering speed) δ' (delta prime) which is a derivative of steering angle δ is in a positive state having a positive polarity during a period of t1~t3, and in a negative state having a negative polarity during a period of t3~t4, as shown in FIG. 6.

The steering angle remains in a positive state having a positive polarity during the period t1~t4, as shown in FIG. 6, a product quantity sgn(δ×δ') of the steering angle δ of the polarity remaining positive and the steering speed δ' having the polarity changed at instant t3 from positive to negative is varied as shown in FIG. 6 if sgn(δ×δ') is set equal to +1 (sgn(δ×δ')=+1) when the product quantity sgn(δ×δ') is positive, and sgn(δ×δ') is set equal to −1 (sgn(δ×δ')=−1) when the product quantity sgn(δ×δ') is negative.

The fact that the product quantity sgn(δ×δ') of steering angle δ and steering speed δ' is positive (+1) means that a turning steering is in progress for the J turn operation, and the fact that the product quantity sgn(δ×δ') is negative (−1) means that a returning steering is in progress for the J turn operation. In the case of the turning steering, the steering angle (or the absolute value of the steering angle) is increased, and the steering position of the steering wheel is turned away from a neutral position for the straight running operation. In the returning steering, the steering angle (or the absolute value of the steering angle) is decreased, and the steering position of the steering wheel is returned toward the neutral straight ahead position.

An absolute turning steering speed δ'yg that is the absolute value of the steering speed during the turning steering during which the product quantity sgn(δ×δ') between steering angle δ and steering speed δ' is positive (+1) is varied in the form obtained by transferring the form of the absolute value of steering speed δ' during the period of t1~t3.

In this embodiment, instead of using this absolute turning steering speed δ'yg (corresponding to the actual steering speed) directly without modification, the control system calculates the limit lateral acceleration Yg* by using a peak-hold value δ'ygh (corresponding to a modified steering speed) of the absolute turning steering speed δ'yg shown by a broken line in the lowermost row of FIG. 6, in a following manner.

The peak-hold value δ'ygh (modified steering speed) of the absolute turning steering speed δ'yg is obtained, as shown by a solid line in the lowermost row of FIG. 6, by continuing a following selective use of the absolute turning steering speed δ'yg, as peak-hold value δ'ygh, until instant t3 at which a returning steering is started. In this selective use of the absolute turning steering speed δ'yg, while the absolute turning steering speed δ'yg is increasing, the increasing absolute turning steering speed δ'yg is used as peak-hold value δ'ygh, without modification. While absolute turning steering speed δ'yg is decreasing, on the other hand, the controller uses, as peak-hold value δ'ygh, a highest or peak value of the absolute turning steering speed δ'yg before the decrease.

The following is explanation on the calculation of calculating limit lateral acceleration yg* by using the thus-determined peak-hold turning steering speed δ'ygh, with reference to FIGS. 7 and 8.

First, from a predetermined characteristic shown as an example in FIG. 7, by search by map, the controller determines the decrease quantity Ygs of limit lateral acceleration Yg* (limit correction quantity) corresponding to the steering speed, for use in determining the limit lateral acceleration Yg* according to the mathematical expression (Yg*=Ygc+Ygs).

The decrease quantity Ygs (limit correction quantity) of the limit lateral acceleration Yg corresponding to the steering speed is varied as shown, as an example, in FIG. 7, in dependence on the peak-hold turning steering speed δ'ygh (modified steering speed). The decrease quantity Ygs (limit correction quantity) of the limit lateral acceleration Yg corresponding to the steering speed becomes greater as the peak-hold turning steering speed δ'ygh increases when the peak-hold turning steering speed δ'ygh is between a first predetermined value δ'ygh1 and a second predetermined value δ'ygh2. The decrease quantity Ygs of the limit lateral acceleration Yg corresponding to the steering speed is held equal to zero when the peak-hold turning steering speed δ'ygh is lower than the first predetermined value δ'ygh1. The decrease quantity Ygs of the limit lateral acceleration Yg corresponding to the steering speed is held equal to a maximum value when the peak-hold turning steering speed δ'ygh is higher than or equal to the second predetermined value δ'ygh2. Between first predetermined value δ'ygh1 (delta prime ygh1) and second predetermined value δ'ygh2 (delta prima ygh2)(>first predetermined value δ'ygh1), the limit decrease quantity Ygs increases monotonically, linearly in the example of FIG. 7, with increase of the peak-hold turning steering speed δ'ygh. The vertical axis of FIG. 7 represents the limit correction quantity (the limit lateral acceleration correction quantity, in this example), and the correction quantity is an increase quantity in the positive direction and a decrease quantity in the negative direction.

The limit lateral acceleration Yg* determined according to the equation (Yg*=Ygc+Ygs) by using the steering speed dependent limit lateral acceleration decrease quantity Ygs (negative value) determined from the peak-hold turning steering speed δ'ygh on the basis of the map corresponding to FIG. 7 becomes a quantity smaller than the arbitrary predetermined value Ygc by the above-mentioned steering speed dependent limit lateral acceleration decrease quantity Ygs, as shown by a solid line in FIG. 8. The steering angle δ and the peak-hold turning steering speed δ'ygh of FIG. 8 are varied in the same manner over time as in FIG. 6.

The target vehicle speed VSP* determined at step S13 of FIG. 2 as mentioned before, to prevent exceedance beyond the limit lateral acceleration Yg* is varied as shown by a solid line in FIG. 8. The target deceleration Xg* determined at step S14 of FIG. 2 as mentioned before to bring the vehicle speed VSP to the target vehicle speed VSP* is varied as shown by a solid line in FIG. 8. As evident from these quantities, this embodiment can provide following operations and effects.

The limit lateral acceleration Yg* is varied as shown by a broken line in FIG. 8 if limit lateral acceleration Yg* is determined from the steering speed dependent limit lateral acceleration decrease quantity Ygs determined, from the map of FIG. 7, by using the absolute turning steering speed δ'yg shown by a broken line in FIG. 8, directly, instead of the peak-hold turning steering speed δ'ygh shown by the solid line in FIG. 8. As a result, the target vehicle speed VSP* and target deceleration Xg* are varied as shown by broken lines in FIG. 8.

Therefore, the restoration of the vehicle speed (deceleration restoration) is started due to an end of the turning behavior control, at the instant t2 still during the period t1~t3 of the turning steering, the target vehicle speed VSP* is changed from the decreasing state to the increasing state (the target deceleration Xg* is changed from the increasing state to the decreasing state) prematurely during the turning steering period, and the control is changed to a mode to increase the vehicle speed by the excess of target vehicle speed VSP* over vehicle speed VSP.

Therefore, at instant t2' during the turning steering period, because of the fulfillment of the condition of δ'yg<δ'ygh1 (cf. FIG. 7)(the steering speed becomes lower than first predetermined value δ'ygh1), the vehicle speed decrease (deceleration) control for preventing the steering speed dependent limit lateral acceleration Yg* from being exceeded is ended, so that there arises the problem that the vehicle speed is varied unnaturally and uncomfortably during the turning steering period t2~t3.

By contrast, according to this embodiment, the limit lateral acceleration Yg* is determined from the steering speed dependent limit lateral acceleration decrease quantity Ygs determined, from the map of FIG. 7, by using the peak-hold turning steering speed δ'ygh shown by the solid line in FIG. 8, and accordingly the limit lateral acceleration Yg* is varied over time as shown by the solid line in FIG. 8. As a result, the target vehicle speed VSP* and target deceleration Xg* are varied as shown by the solid lines in FIG. 8.

Therefore, the restoration of the vehicle speed (deceleration restoration) is not started due to an end of the turning behavior control during the turning steering period t1~t3, the target vehicle speed VSP* is held lower than vehicle speed VSP, and the control is not changed to the mode to increase the vehicle speed.

Therefore, at an instant t3' after instant t3 at which the turning steering is ended and the returning steering is started, the condition of δ'ygh<δ'ygh1 (cf. FIG. 7) is fulfilled (the peak-hold steering speed δ'ygh becomes lower than δ'ygh1), and hence the control system terminates the vehicle speed decrease (deceleration) control for preventing the steering speed dependent limit lateral acceleration Yg* from being exceeded, at instant t3', so that the control system can resolve the problem that the vehicle speed is varied unnaturally and uncomfortably during the turning steering period t2~t3.

Furthermore, in this embodiment, the limit lateral acceleration Yg* is decreased by increasing the decrease quantity Ygs of the steering speed dependent limit lateral acceleration Yg*, with increase of the peak-hold turning steering speed δ'ygh as mentioned with reference to FIG. 7. Therefore, when the turning steering speed is faster and the demand for emergency avoidance is high, then the limit lateral acceleration Yg* is lower and the control system can improve the safety by starting the turning behavior control by vehicle speed decrease during steering (the vehicle speed decreasing control of decreasing the vehicle speed so as to prevent the lateral acceleration from exceeding limit lateral acceleration Yg*) earlier.

Moreover, as explained before and as shown in FIG. 9 in the form of an enlarge view of the peak-hold turning steering speed δ'ygh shown in FIG. 8, the peak-hold value δ'ygh (modified steering speed) of the absolute turning steering speed δ'yg is set equal to the absolute turning steering speed δ'yg while the absolute turning steering speed δ'yg is increasing, and set equal to the most recent peak value of the absolute turning steering speed δ'yg while the absolute steering speed δ'yg is decreasing. Therefore, even if the absolute turning steering speed δ'yg is fluctuated as shown in FIG. 9, by noise involved in the sensed value of steering angle sensor 13 and noise involved in the calculation of the steering speed δ', it is possible to remove these noise components shown by hatching in FIG. 9, from the peak-hold turning steering speed δ'ygh.

These noises cause the steering speed dependent limit lateral acceleration decrease quantity Ygs, and hence the limit lateral acceleration Yg* to fluctuate, and thereby make the turning behavior control unstable. However, the control system of this embodiment eliminates the noise components from the peak-hold turning steering speed δ'ygh, as mentioned above, and thereby stabilizes the performance of the turning behavior control.

At instant t3 at which the turning steering ends (and the returning steering starts) and the steering speed δ' becomes equal to zero shown in FIGS. 8 and 9, the control system is required to terminate the turning behavior control by returning the peak-hold turning steering speed δ'ygh to the absolute turning steering speed δ'yg. In this case, the peak-hold turning steering speed δ'ygh is returned to the absolute turning steering speed δ'yg at a predetermined gradient Δδ (or time rate of change or decrease) as shown in FIGS. 8 and 9.

If the peak-hold turning steering speed δ'ygh is returned abruptly to the absolute turning steering speed δ'yg at the turning steering end instant (returning steering start instant) t3 shown in FIGS. 8 and 9, the sharp decrease of the peak-hold turning steering speed δ'ygh causes a sharp increase of the limit lateral acceleration Yg* and hence causes a shock due to a sharp drop of the vehicle deceleration.

In this embodiment, by contrast, the peak-hold turning steering speed δ'ygh is returned to the absolute turning steering speed δ'yg at the predetermined gradient or time rate of decrease Δδ, as shown in FIGS. 8 and 9. Therefore, the limit lateral acceleration Yg* is returned gradually to the predetermined value Ygc as shown by a variation over time after instant t3 in FIG. 8. Therefore, the control system according to this embodiment does not cause a shock due to a drop of the vehicle deceleration.

Figure 10:
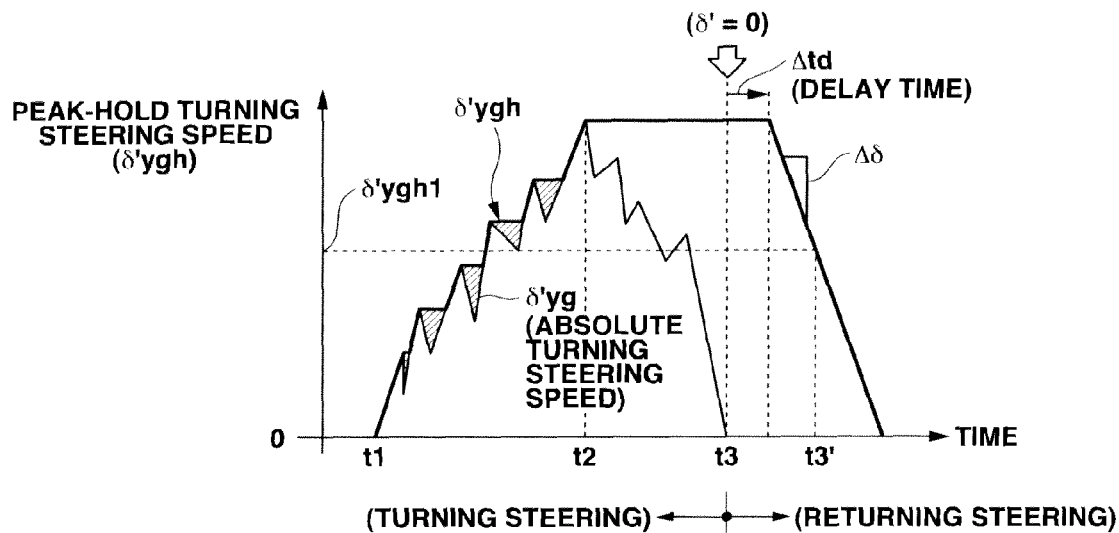
FIG. 10 is a time chart similar to FIG. 9, but showing another example for determining the peak-hold turning steering speed.

In the above-mentioned example, the turning steering end instant (returning steering start instant) t3 shown in FIGS. 8 and 9 is an instant to start the control for returning the peak-hold turning steering speed δ'ygh to the absolute turning steering speed δ'yg. However, as shown in FIG. 10 similar to FIG. 9, it is optional to hold the value of the peak-hold turning steering speed δ'ygh at instant t3 during a predetermined delay time Δtd from the turning steering end instant (returning steering start instant) t3, and then start the control for returning the peak-hold turning steering speed δ'ygh to the absolute turning steering speed δ'ygh at the expiration of delay time Δtd.

This example can provide following effects. Since the steering speed δ' becomes equal to zero at the turning steering end instant (returning steering start instant) t3, the absolute turning steering speed δ'yg (peak-hold turning steering speed δ'ygh) is susceptible to influences from noise involved in the sensed value of steering angle sensor 13 and noise in the calculation of steering speed δ', and hence the turning behavior control becomes unstable in some cases. By starting the control for returning the peak-hold turning steering speed δ'ygh to absolute turning steering speed δ'yg at the end of the delay time Δtd from instant t3, the control system can eliminate influences of these noises and stabilize the turning behavior control.

Figure 11:
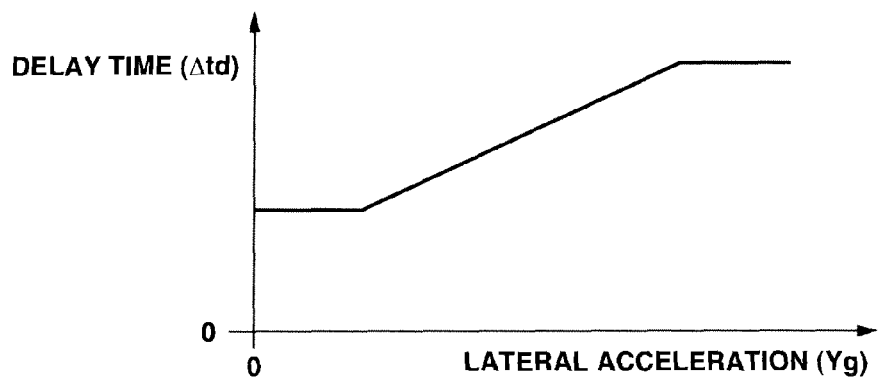
FIG. 11 is a characteristic diagram showing a variation characteristic of a delay time shown in FIG. 10.

The delay time Δtd may be elongated with increase of lateral acceleration Yg, as shown in FIG. 11. In this case, delay time Δtd may be increased monotonically as lateral acceleration becomes higher. For example, in FIG. 11, the delay time is increased linearly from a predetermined shorter time value to a predetermined longer time value between a predetermined lower lateral acceleration value and a predetermined higher lateral acceleration value, held constantly equal to the predetermined shorter time value in a region lower than the predetermined lower lateral acceleration value, and held constantly equal to the predetermined longer time value in a region higher than or equal to the predetermined higher lateral acceleration value.

Accordingly, the limit lateral acceleration Yg is held at the value at t3 for a longer period of time Δtd after the turning steering end instant (returning steering start instant) t3 when the lateral acceleration Yg acting on the vehicle is great. By so doing, the control system can reduce variation of target deceleration Xg as much as possible, and restrain variation of the vehicle behavior.

Figure 12:
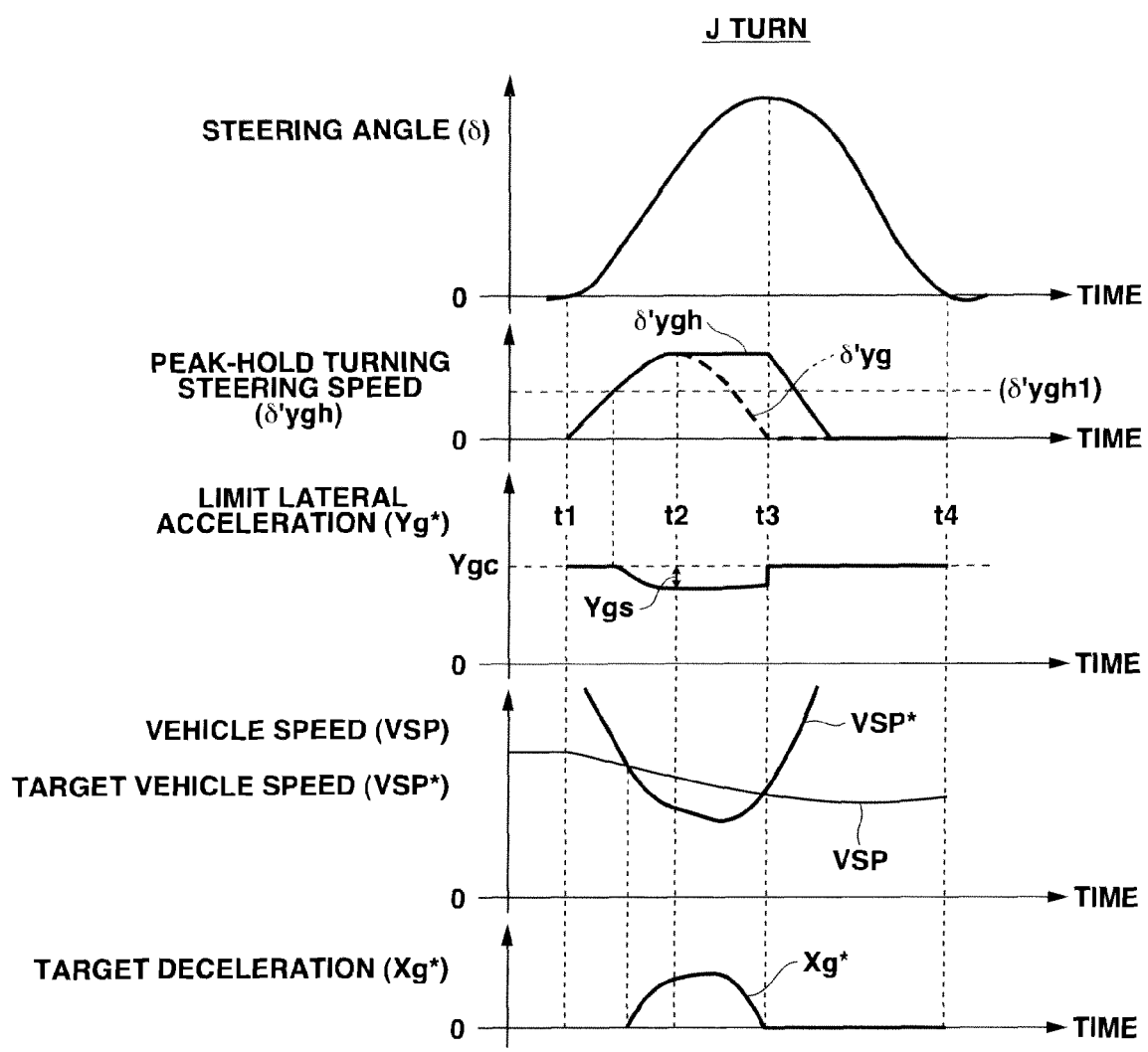
FIG. 12 is a time chart of operations when the turning behavior control of FIG. 2 terminates the turning behavior control in accordance with the target vehicle speed and target deceleration in the case of the J-turn of the vehicle.

In the above examples, the control system is arranged to detect the turning steering end instant (returning steering start instant) t3 at which steering speed δ' becomes equal to zero, and to start the control to return the peak-hold turning steering speed δ'ygh to absolute turning steering speed δ'yg at instant t3 or at the end of delay time Δtd from t3. However, it is possible to employ an example shown in FIG. 12, instead. As shown in FIG. 12, when target vehicle speed VSP* becomes higher than vehicle speed VSP and the control is changed from deceleration control to acceleration control (when the need for producing the target deceleration Xg is eliminated), or when target deceleration Xg* becomes lower than or equal to zero (when the need for producing the target deceleration Xg is eliminated), then, at this instant t3, the control system of this example terminates the vehicle speed decreasing control for limiting the lateral acceleration in dependence on the steering speed, by setting the steering speed dependent limit lateral acceleration decrease quantity (negative value) Ygs equal to zero, and returning the limit lateral acceleration Yg* to predetermined value Ygc (0.45 G, for example).

Even before the turning steering end instant (returning steering start instant) t3 at which steering speed δ' becomes equal to zero, the elimination of need for producing target deceleration Xg* means that the steering speed dependent vehicle speed decreasing control for limiting the lateral acceleration (for controlling the turning behavior) is not required any more. Therefore, as mentioned before, when target vehicle speed VSP* becomes higher than vehicle speed VSP and the control is changed from deceleration control to acceleration control (when the need for producing the target deceleration Xg* is eliminated), or when target deceleration Xg* becomes lower than or equal to zero (when the need for producing target deceleration Xg is eliminated), then, at this instant t3, by terminating the steering speed dependent vehicle speed decreasing control for limiting the lateral acceleration, by setting the steering speed dependent limit lateral acceleration decrease quantity (negative value) Ygs equal to zero, and returning the limit lateral acceleration Yg* to predetermined value Ygc (0.45 G, for example), the control system can prevent useless execution of the steering speed dependent vehicle speed decreasing control for limiting the lateral acceleration.

In this case, the control of returning the limit lateral acceleration to predetermined value Ygc (0.45 G, for example) by reducing the steering speed dependent limit lateral acceleration decrease quantity (negative) Ygs, to zero, does not cause a shock because target deceleration Xg* is not influenced even if this control is performed abruptly, as shown in FIG. 12.

Embodiment 2

Figure 13:
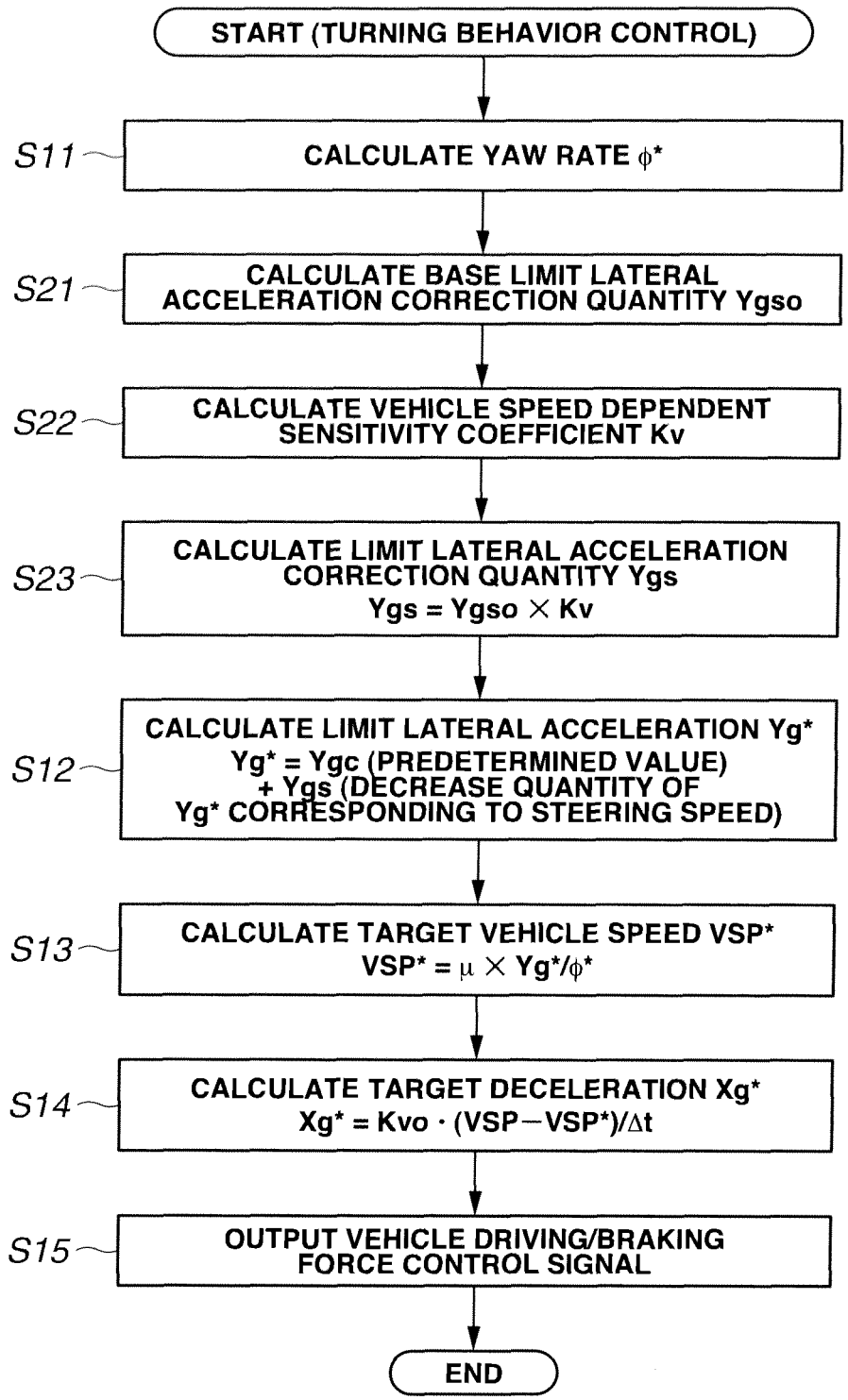
FIG. 13 is a flowchart of a turning behavior control program similar to FIG. 2 but showing a second embodiment of the present invention.

FIG. 13 shows a turning behavior control program similar to FIG. 2, but showing a second embodiment according to the present invention. In the second embodiment, steps S21~S23 are interposed between step S11 and step S12 shown in FIG. 2.

Figure 14:
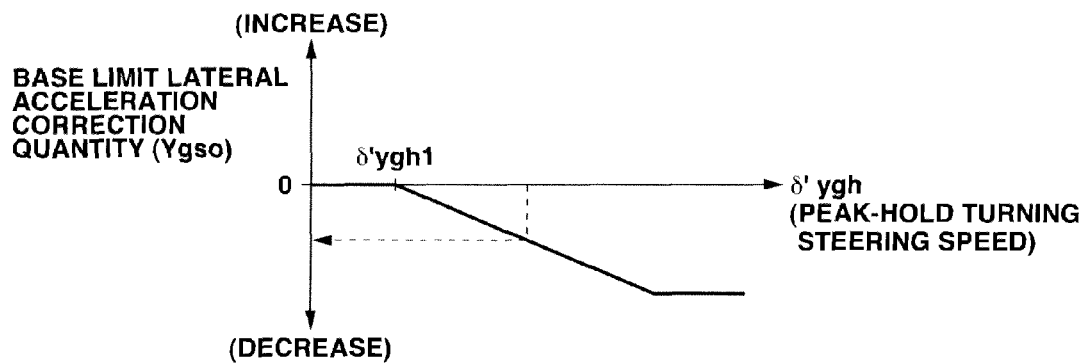
FIG. 14 is a characteristic view showing variation of a base limit lateral acceleration correction quantity used in the second embodiment.

At step S21, the controller determines a base limit lateral acceleration correction quantity Ygso (base correction quantity) from the peak-hold turning steering speed δ'ygh on the basis of predetermined map as shown in FIG. 14. At step S22, the controller determines a vehicle speed dependent sensitivity coefficient Kv from vehicle speed VSP on the basis of a predetermined map as shown in FIG. 15.

At step S23, the controller calculate a limit lateral acceleration correction quantity Ygs=Ygso×Kv (limit correction quantity) by multiplying the base limit lateral acceleration correction quantity Ygso determined at S21, by the vehicle speed dependent sensitivity coefficient Kv determined at S22.

Figure 15:
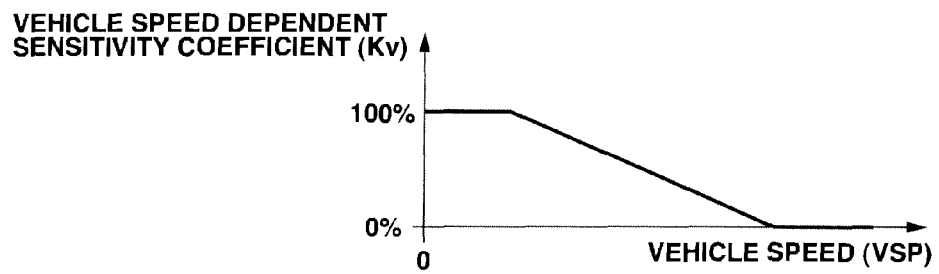
FIG. 15 is a characteristic view of variation of a vehicle speed dependent sensitivity coefficient used in the second embodiment.

The base limit lateral acceleration correction quantity Ygso (base correction quantity) shown in FIG. 14 is set as a quantity similar to the limit lateral acceleration correction quantity Ygso explained with reference to FIG. 7, and the vehicle speed dependent sensitivity coefficient Kv shown in FIG. 15 is a coefficient which varies between 0% and 100%, in dependence on vehicle speed VSP, and which decreases with increase of vehicle speed VSP. In this example, the vehicle speed dependent sensitivity coefficient Kv decreases monotonically (decreases linearly in the example of FIG. 15) from a maximum value (100%) to a minimum value (0%) in a region between a predetermined lower vehicle speed value and a predetermined higher vehicle speed value, held constantly at the maximum value in a region lower than the predetermined lower vehicle speed value, and held constantly at the minimum value in a region higher than or equal to the predetermined higher vehicle speed value.

Therefore, in the second embodiment, the limit lateral acceleration correction quantity Ygs becomes smaller as the vehicle speed becomes higher, and hence the limit lateral acceleration Yg (=Ygc+Ygs) determined at S12 by using this limit lateral acceleration correction quantity Ygs becomes smaller as vehicle speed VSP increases.

Therefore, in the second embodiment, by using FIG. 8 for explanation, the limit lateral acceleration correction quantity Ygs and limit lateral acceleration Yg* become lower as the vehicle speed becomes higher, and with increase of vehicle speed VSP, the control system can decrease the sensitivity of changing the execution timing of the vehicle speed decreasing control for limiting the vehicle lateral acceleration to limit lateral acceleration Yg*, to the advantage of following effect.

The lateral acceleration is increased by a small steering angle at high vehicle speeds, so that the actuation timing by the steering angular speed is liable to fluctuate. However, in the second embodiment, it is possible to restrain this fluctuation with the above-mentioned decrease of the sensitivity, and thereby restrain the vehicle speed decreasing control from being actuated earlier.

Embodiment 3

Figure 16:
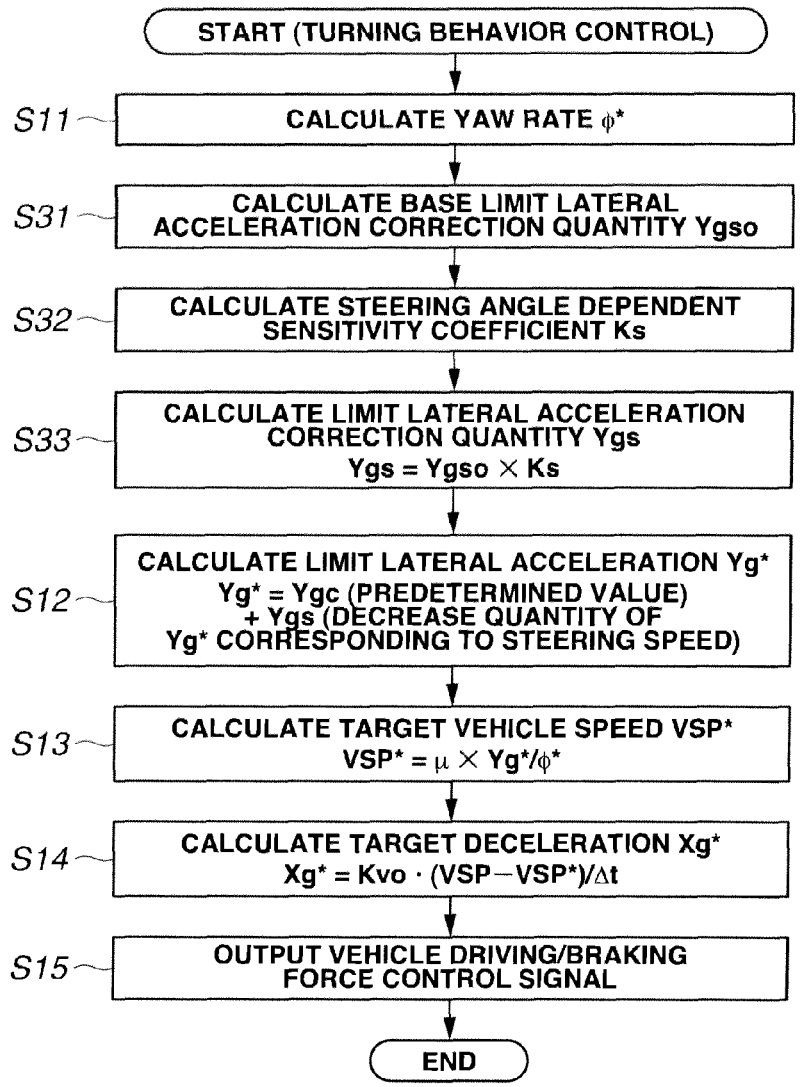
FIG. 16 is a flowchart of a turning behavior control program similar to FIG. 2 but showing a third embodiment of the present invention.

FIG. 16 shows a turning behavior control program similar to FIG. 2, but showing a third embodiment of the present invention. In this embodiment, steps S31~S33 are interposed between step S11 and step S12 shown in FIG. 2.

At step S31, the controller determines the base limit lateral acceleration correction quantity Ygso (base correction quantity) from the peak-hold turning steering speed δ'ygh on the basis of the predetermined map as shown in FIG. 14. At step S32, the controller determines a steering angle dependent sensitivity coefficient Ks from steering angle δ on the basis of a predetermined map as shown in FIG. 17.

At step S33, the controller calculates a limit lateral acceleration correction quantity Ygs=Ygso×Ks by multiplying the base limit lateral acceleration correction quantity Ygso determined at S31, by the steering angle dependent sensitivity coefficient Ks determined at S32.

Figure 17:
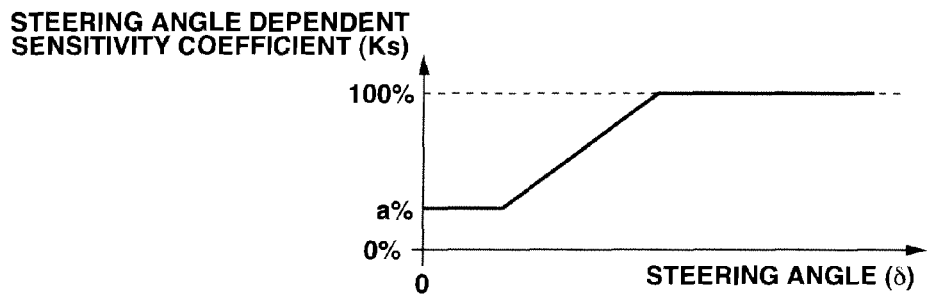
FIG. 17 is a characteristic view of variation of a steering angle dependent sensitivity coefficient used in the third embodiment.

The steering angle dependent sensitivity coefficient Ks shown in FIG. 17 is a coefficient which varies between a predetermined a % and 100%, in dependence on steering angle δ, and which decreases with decrease of steering angle δ. In this example, the steering angle dependent sensitivity coefficient Ks increases monotonically (increases linearly in the example of FIG. 17) from a minimum value (a %) to a maximum value (100%) in a region between a predetermined smaller angle value and a predetermined greater angle value, held constantly at the minimum value in a region smaller than the predetermined smaller angle value, and held constantly at the maximum value in a region greater than or equal to the predetermined greater angle value.

Therefore, in the third embodiment, the limit lateral acceleration correction quantity Ygs becomes smaller as the steering angle becomes smaller, and hence the limit lateral acceleration Yg*(=Ygc+Ygs) determined at S12 by using this limit lateral acceleration correction quantity Ygs becomes smaller as steering angle δ decreases.

Therefore, in the third embodiment, by using FIG. 8 for explanation, the limit lateral acceleration correction quantity Ygs and limit lateral acceleration Yg* become lower as the steering angle becomes smaller, and with decrease of steering angle δ, the control system can decrease the sensitivity of changing the execution timing of the vehicle speed decreasing control for limiting the vehicle lateral acceleration to limit lateral acceleration Yg*, to the advantage of following effect.

When the steering angle is small, a disturbance from the road surface (a disturbance caused by seam or rut of the road) tends to cause changes in the steering angle of the steering wheel, and to vary or fluctuate the actuation timing based on the steering angular speed. However, in the third embodiment, it is possible to restrain this fluctuation with the above-mentioned decrease of the sensitivity, and thereby to restrain the vehicle speed decreasing control from being actuated earlier.

A combination of the example of FIGS. 13~15 and the example of FIGS. 16~17 is possible. In this case, the limit lateral acceleration correction quantity Ygs and limit lateral acceleration Yg* are varied in dependence on vehicle speed VSP and steering angle δ.

Figure 18:
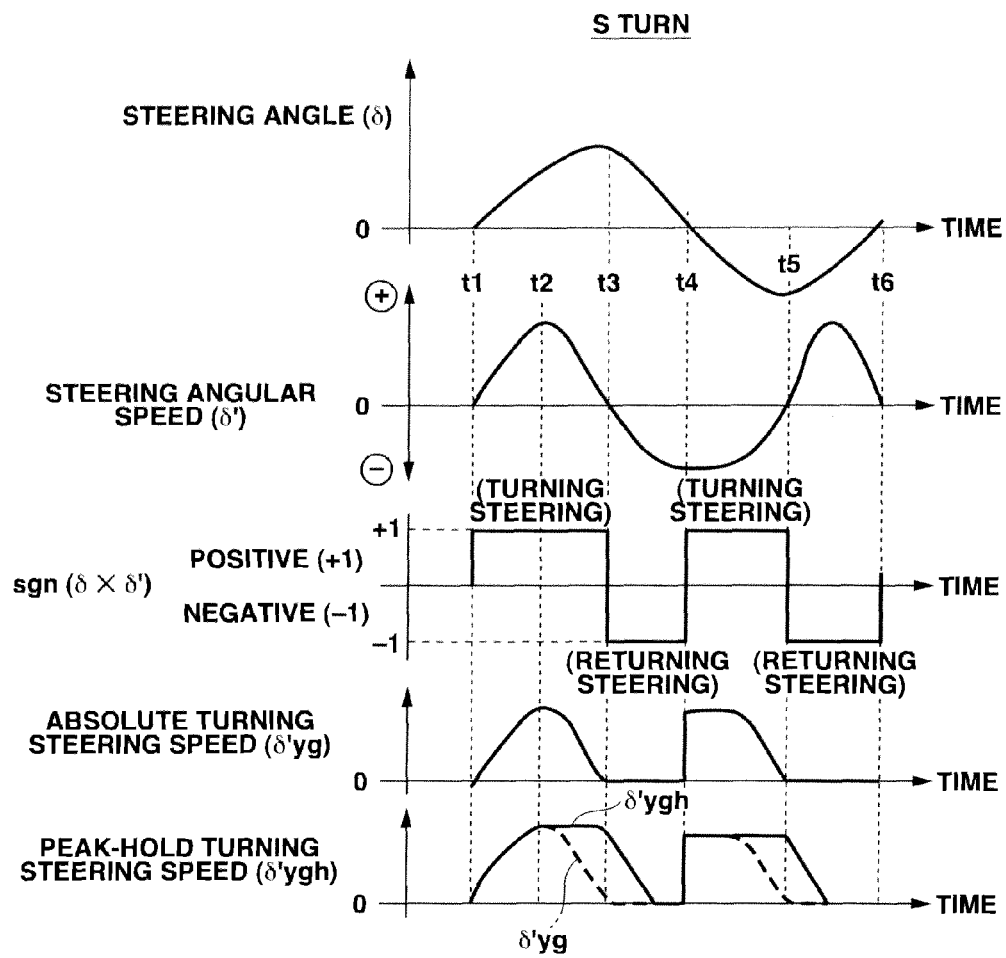
FIG. 18 is a time chart of operations when the turning behavior control shown in FIG. 2, 13, 16 determines the peak-hold turning steering speed in the case of an S turn of the vehicle.

In either case, the peak-hold turning steering speed δ'ygh is varied as shown in FIG. 18 in the case of an S turn of the vehicle.

FIG. 18 is a time chart in the case of an S turn in which steering angle δ is increased from instant t1 as shown in the figure, from the straight ahead state in which steering angle δ is zero, then steering angle δ is decreased from instant t3 as shown until steering angle δ is reduced to zero at instant t4, then from t4, steering angle δ is increased from zero again in the opposite direction by turning the steering wheel in the opposite steering direction, and the steering angle δ in the opposite direction is decreased from instant t5 as shown until steering angle δ is reduced to zero at instant t6.

When steering angle δ is varied over time in this way, the steering angular speed (steering speed) δ' which is a derivative of the steering angle is varied in such a manner that steering angular speed δ' has the positive polarity during the period from t1 to t3, has the negative polarity during the period from t3 to t5, and has the positive polarity during the period from t5 to t6, as shown in FIG. 18.

As shown in FIG. 18, the steering angle δ has the positive polarity during the period from t1 to t4, and has the negative polarity during the period from t4 to t6.

The product quantity sgn(δ×δ') of the steering angle δ and the steering speed δ' varying in the polarity as mentioned above is varied as shown in FIG. 18 if sgn(δ×δ') is set equal to +1 (sgn(δ×δ')=+1) when the product quantity sgn(δ×δ') is positive, and sgn(δ×δ') is set equal to −1 (sgn(δ×δ')=−1) when the product quantity sgn(δ×δ') is negative.

The fact that the product quantity sgn(δ×δ') of steering angle δ and steering speed δ' is positive (+1) means that the turning steering is in progress for the S turn operation, and the fact that the product quantity sgn(δ×δ') is negative (−1) means that the returning steering is in progress for the S turn operation.

The absolute turning steering speed δ'yg that is the absolute value of the steering speed during the turning steering during which the product quantity sgn(δ×δ') between steering angle δ and steering speed δ' is positive (+1) is varied in the form obtained by transferring the form of the absolute value of steering speed δ' during the period of t1~t3 and the form of the absolute value of steering speed δ' during the period of t4~t5.

The peak-hold value δ'ygh of the absolute turning steering speed δ'yg is determined by setting the peak-hold value δ'ygh equal to the absolute turning steering speed δ'yg while the absolute turning steering speed δ'yg is increasing, and by holding the peak-hold value δ'ygh equal to the last peak value of absolute turning steering speed δ'yg while the absolute turning steering speed δ'yg is decreasing. By continuing this selective use, as the peak-hold value δ'ygh, of the increasing absolute turning steering speed δ'yg and the last peak value of the decreasing absolute turning steering speed δ'yg before the decrease until the returning steering start instant t3 or t5, the controller can obtain the peak-hold value δ'ygh of the absolute turning steering speed δ'yg, as shown by a solid line in the lowermost row of FIG. 18.

In the case of the S turn operation, the peak-hold turning steering speed δ'ygh rises in the form of a step change, as shown at instant t4, at the second or subsequent turn. Consequently, the control system can advance the execution timing of the vehicle speed decreasing control for limiting the vehicle lateral acceleration to limit lateral acceleration Yg*, and thereby realize high response performance as required.

Embodiment 4

In a fourth embodiment, the limit lateral acceleration Yg* is calculated by using (as the modified steering speed) a calculated turning steering speed δ'ygo (calculated steering speed) as explained below, instead of the peak-hold turning steering speed δ'ygh used in the first embodiment.

The calculated turning steering speed δ'ygo is determined in the following manner. While the absolute turning steering speed δ'yg is increasing, the calculated turning steering speed δ'ygo is set equal to the increasing absolute turning steering speed δ'yg, without modification. While the absolute turning steering speed δ'yg is decreasing, on the other hand, the calculated turning steering speed δ'ygo is set equal to a steering speed obtained by limiting the decreasing rate, or rate of decrease, of the decreasing absolute turning steering speed δ'yg to a predetermined decreasing rate. This selective use of absolute turning steering speed δ'yg is continued until the returning steering start instant. In this way, the modified steering speed remains equal to the actual steering speed while the actual steering speed is increasing. When the actual steering speed is decreasing, the modified steering speed is held constant or unchanged (in the case of the peak-hold value of the first embodiment) or decreased more gradually than the decreasing actual steering speed. In either case, when the actual steering speed is decreasing, the modified steering speed is held at a level higher than the actual steering speed (though the modified steering speed is not increased).

Figure 19:
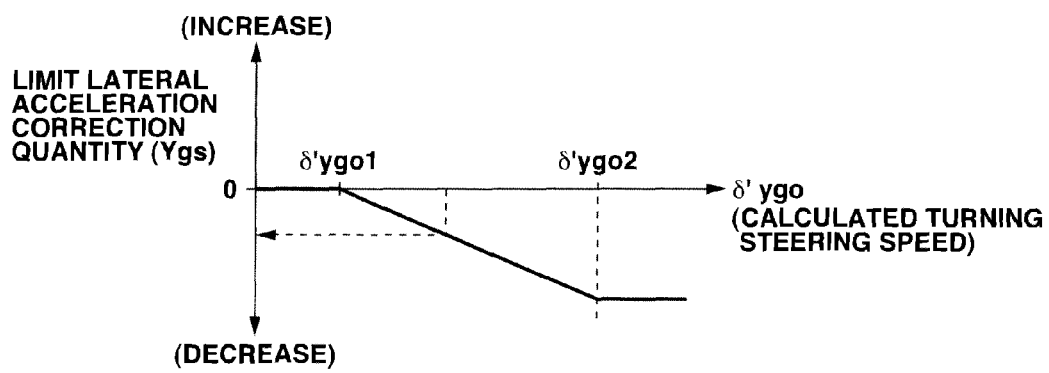
FIG. 19 is a characteristic view of variation of the limit lateral acceleration correction quantity.

In the fourth embodiment, from a predetermined characteristic shown as an example in FIG. 19, by search by map, the controller determines the decrease quantity Ygs of limit lateral acceleration Yg* corresponding to the steering speed, for use in determining the limit lateral acceleration Yg* according to the mathematical expression (Yg*=Ygc+Ygs).

Since this map has a characteristic identical to the variation characteristic view shown in FIG. 7, repetitive explanation is omitted. A predetermined value δ'ygo1 shown in FIG. 19 is equal to δ'ygh1 of FIG. 7, and a predetermined value δ'ygo2 of FIG. 19 is equal to δ'ygh2 of FIG. 7.

Figure 20:
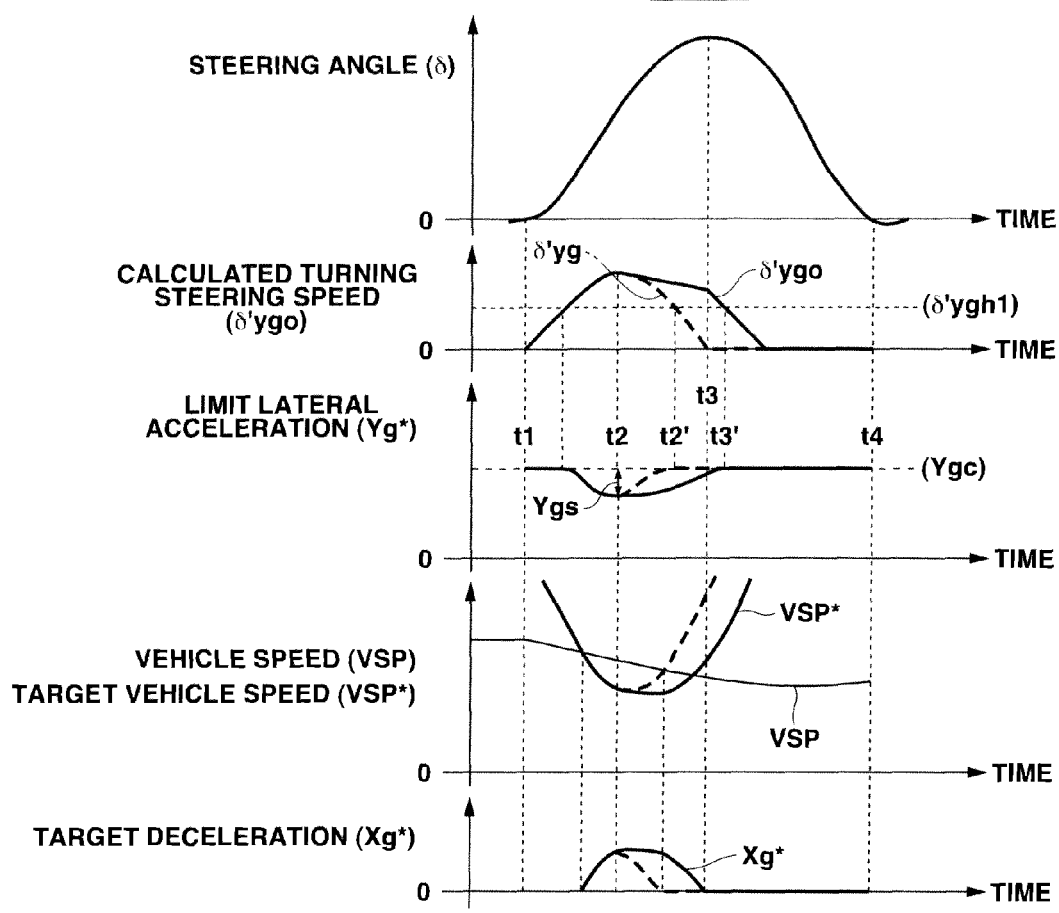
FIG. 20 is a time chart of operations when the turning behavior control determines the limit lateral acceleration, target vehicle speed and target deceleration in the case of the J turn of the vehicle of a fourth embodiment.

According to the fourth embodiment, the limit lateral acceleration Yg* is calculated from the steering speed dependent limit lateral acceleration decrease quantity Ygs determined, from the map of FIG. 19, by using the calculated turning steering speed δ'ygo shown by the solid line in FIG. 20. Accordingly the limit lateral acceleration Yg* is varied as shown by the solid line in FIG. 20. As a result, the target vehicle speed VSP* and target deceleration Xg* are varied as shown by the solid lines in FIG. 20.

Therefore, the restoration of the vehicle speed (deceleration restoration) is not started due to an end of the turning behavior control during the turning steering period t1~t3, the target vehicle speed VSP* is held lower than vehicle speed VSP, and the control is not changed to the mode to increase the vehicle speed.

Therefore, at an instant t3' after instant t3 at which the turning steering is ended and the returning steering is started, the condition of δ'ygo<δ'ygo1 (cf. FIG. 19) is fulfilled, and hence the control system terminates the vehicle speed decrease (deceleration) control for preventing the steering speed dependent limit lateral acceleration Yg* from being exceeded, at instant t3', so that the control system can resolve the problem that the vehicle speed is varied unnaturally and uncomfortably during the turning steering period t2~t3.

Moreover, as explained before and as shown in FIG. 21 in the form of an enlarge view of the calculated turning steering speed δ'ygh shown in FIG. 20, the calculated value δ'ygo of the absolute turning steering speed δ'yg is set equal to the absolute turning steering speed δ'yg while the absolute turning steering speed δ'yg is increasing, and set equal to the steering speed decreasing, at the predetermined limited decrease rate, with the decreasing absolute turning steering speed δ'yg while the absolute turning steering speed δ'yg is decreasing.

Figure 21:
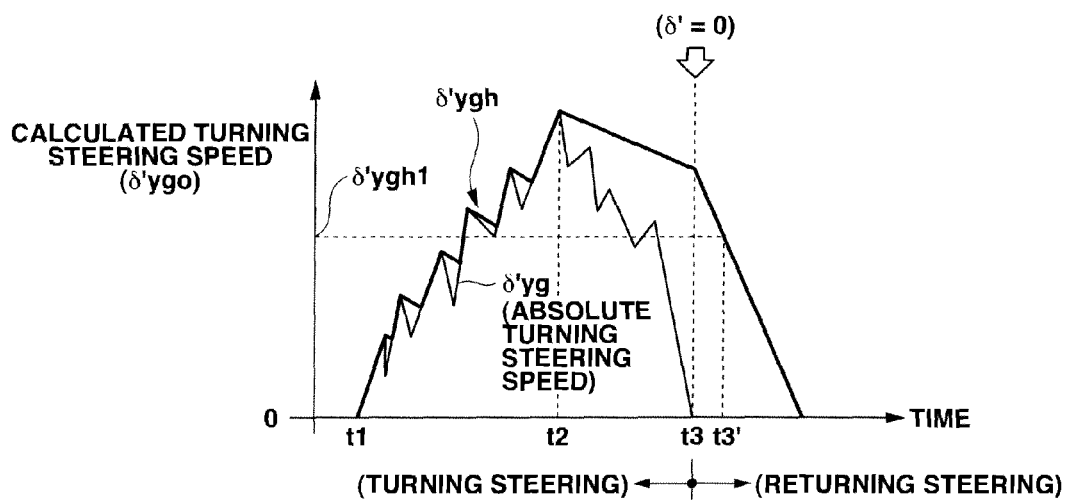
FIG. 21 is a time chart showing time variation of the peak-hold turning steering speed in FIG. 20, in close-up.

Therefore, even if the absolute turning steering speed δ'yg is fluctuated as shown in FIG. 21, by nose involved in the sensed value of steering angle sensor 13 and noise involved in the calculation of the steering angular speed δ', it is possible to remove these noise components shown by hatching in FIG. 21, from the calculated turning steering speed δ'ygo.

These noises cause fluctuation of the steering speed dependent limit lateral acceleration decrease quantity Ygs, and hence fluctuation of the limit lateral acceleration Yg*, and thereby make the turning behavior control unstable. However, the control system of this embodiment eliminates the noise components from the calculated turning steering speed δ'ygo, as mentioned above, and thereby stabilizes the performance of the turning behavior control.

Embodiment 5

In a fifth embodiment, a target deceleration decreasing gradient or target deceleration decrease-side gradient Xgdn is calculated from the peak-hold turning steering speed δ'ygh used in the first embodiment, and used for restraining a sharp decrease of the target deceleration Xg*.

Figure 22:
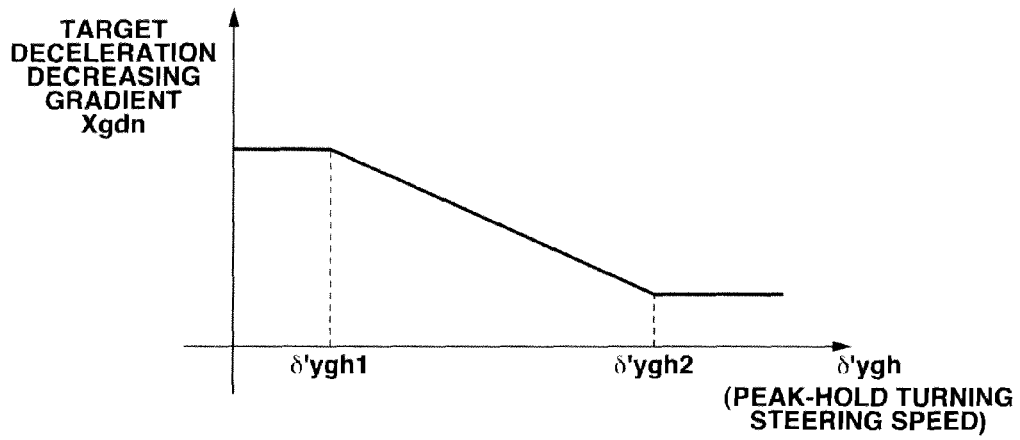
FIG. 22 is a characteristic view of variation of a target deceleration decreasing gradient.

The target deceleration decreasing gradient Xgdn varies as shown, for example, in FIG. 22, in dependence on peak-hold turning steering speed δ'ygh. The target deceleration decreasing gradient Xgdn is decreased (decreased monotonically, in this example decreased linearly) with increase of peak-hold turning steering speed δ'ygh when peak-hold turning steering speed δ'ygh is between a first predetermined value δ'ygh1 and a second predetermined value δ'ygh2. Target deceleration decreasing gradient Xgdn is held equal to a maximum value when peak-hold turning steering speed δ'ygh is lower than first predetermined value δ'ygh1. Target deceleration decreasing gradient Xgdn is held equal to a minimum value when peak-hold turning steering speed δ'ygh is higher than or equal to the second predetermined value δ'ygh2.

Figure 23:
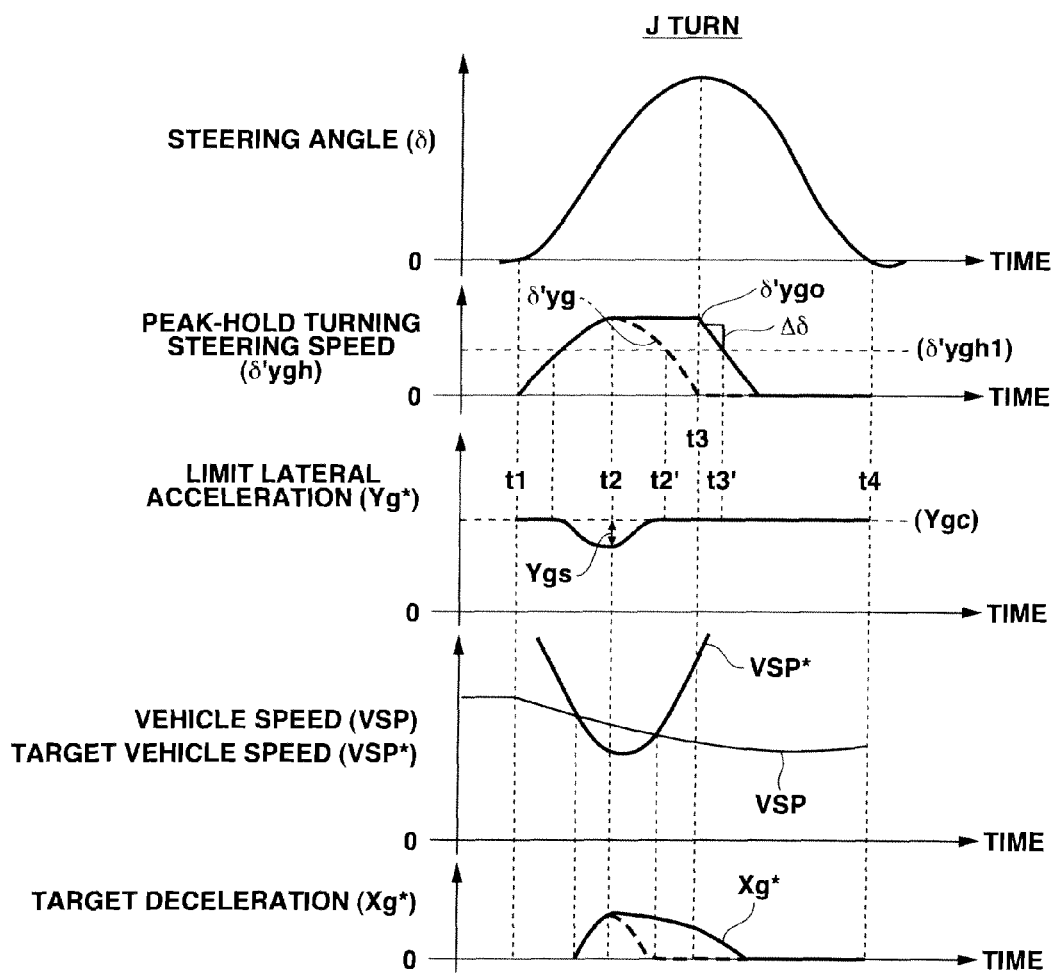
FIG. 23 is a time chart of operations when the turning behavior control determines the limit lateral acceleration, target vehicle speed and target deceleration in the case of the J turn of the vehicle of a fifth embodiment.

The control system according to this embodiment determines the target deceleration decreasing gradient Xgdn from the map of FIG. 22, by using the peak-hold turning steering speed δ'ygh (modified steering speed) shown by a solid line in FIG. 23, and thereby limits the decrease of the target deceleration Xg*.

Accordingly, the limit lateral acceleration decrease quantity Ygs is calculated by using the absolute turning steering speed δ'yg (actual steering speed) directly. As a result, the limit lateral acceleration Yg* and target vehicle speed VSP* are varied as shown in FIG. 23. However, target deceleration Xg* is varied, as shown by a solid line in FIG. 23, in such a manner that the decreasing gradient of target deceleration Xg* is limited in accordance with peak-hold turning steering speed δ'ygh (modified steering speed).

Therefore, the control system does not start the restoration of the vehicle speed (deceleration restoration) due to an end of the turning behavior control during the turning steering period t1~t3 and does not change over the control to the mode increasing the vehicle speed. Accordingly, the control system can resolve the problem that the vehicle speed is varied unnaturally and uncomfortably during the turning steering period t2~t3.

According to one (first interpretation) of possible interpretations, in each of the above-mentioned embodiments 1, 2, 3, 4 and 5, a vehicle turning behavior control apparatus comprises (at least) a controlling section (10, for example) which is configured to determine an actual steering speed, to determine a limit behavior dependent on the actual steering speed, to produce a control signal in accordance with the limit behavior, to decreases a vehicle speed by controlling the vehicle speed in accordance with the control signal, and thereby to limit a vehicle turning behavior to the limit behavior. The controlling section determines a modified steering speed in accordance with the actual steering speed, and modifies the control signal in accordance with the modified steering speed. Moreover, the controlling section makes the modified steering speed higher than the actual steering speed when the actual steering speed decreases during a turning steering or turning steering operation in a turning direction away from the neutral position.

According to the above-mentioned first interpretation, the controlling section determines a control quantity (target vehicle speed and/or target deceleration, for example) in accordance with the limit behavior, controls the vehicle speed by producing the control signal in accordance with the control quantity, and thereby limit the vehicle turning behavior to the limit behavior. The controlling section modifies the control signal by modifying at least one of the limit behavior and the control quantity, and, by so doing, prevents unnatural increase of the vehicle speed due to a decrease of the steering speed during the turning steering in the turning direction away from the straight ahead neutral position.

The vehicle turning behavior control apparatus may comprise a sensing section and/or an actuating section, addition to the controlling section. In each of the embodiments, the sensing section may sense at least a steering angle, and the controlling section may determine the actual steering speed (δ') from the sensed steering angle (δ). The actuating section includes an actuator to control the driving/braking force of the vehicle.

According to the above-mentioned first interpretation, in each of the embodiments 1, 2, 3, 4 and 5, a vehicle turning behavior control process or method comprises (at least) first and second process sections (for example, operations and elements constituting the control process). The first process section may comprise a subsection of determining an actual steering speed, a subsection of determining a limit behavior dependent on the actual steering speed, a subsection of producing a control signal in accordance with the limit behavior, and a subsection of decreasing a vehicle speed by controlling the vehicle speed in response to the control signal and limiting a vehicle turning behavior to the limit behavior. The second process subsection may comprise a subsection of determining a modified steering speed in dependence on the actual steering speed, and a subsection of modifying the control signal in accordance with the modified steering speed. In the second process section, the modified steering speed is made higher than the actual steering speed when the actual steering speed becomes lower during a turning steering operation in a turning direction away from a neutral position.

While the steering speed is decreasing during a turning steering operation, the vehicle turning behavior control apparatus according to the above-mentioned embodiments of the present invention limits the vehicle behavior by using a steering speed higher than the decreasing steering speed. Therefore, the vehicle turning behavior control apparatus does not perform a control operation of restoring the vehicle speed (restoring the deceleration) due to end of the turning behavior control while the turning steering operation is still in progress. Therefore, the vehicle turning behavior control apparatus according to the embodiments can eliminate the problem involved in the above-mentioned apparatus of the earlier technology, that the vehicle speed is varied unnaturally and uncomfortably during a turning steering operation.

The present application is based on a Japanese patent application No. 2008-130332 (filed on May 19, 2008) and a Japanese patent application No. 2009-050235. The entire contents of these Japanese applications are hereby incorporated by reference.

The invention claimed is:

1. A vehicle turning behavior control apparatus comprising:
a controlling section to limit a vehicle turning behavior of a vehicle accompanying a steering operation, to a limit turning behavior corresponding to an actual steering speed of the steering operation, by a vehicle speed decrease, the controlling section being configured to calculate a modified steering speed from the actual steering speed, and to calculate the limit turning behavior in accordance with the modified steering speed;
wherein the vehicle turning behavior control apparatus comprises an apparatus configured to limit the turning behavior due to the steering operation to the limit turning behavior corresponding to the steering speed, by the vehicle speed decrease,
wherein the controlling section is configured to use
the actual steering speed as the modified steering speed, when the actual steering speed is increasing during a turning steering for increasing a turning amount, or
a highest value of the actual steering speed before a decrease of the actual steering speed, as the modified steering speed, when the actual steering speed is decreasing during the turning steering, so that the modified steering speed is higher than the actual steering speed,
wherein the controlling section is configured to continue a selective use of the modified steering speed at least until a start of a returning steering for decreasing the steering amount, and
wherein the controlling section is further configured to determine, from the actual steering speed, a turning steering speed which is equal to the actual steering speed during the turning steering for increasing the turning amount and which is held equal to zero during the returning steering,
to calculate the modified steering speed in accordance with the turning steering speed so that the modified steering speed is higher than the turning steering speed when the turning steering speed decreases during the turning steering for increasing the turning amount, and
to determine the limit turning behavior in accordance with the modified steering speed.

2. The vehicle turning behavior control apparatus as recited in claim 1, wherein the controlling section is configured to continue to use, as the modified steering speed for determining the limit turning behavior, the highest value of the actual steering speed for a predetermined time period after the start of the returning steering.

3. The vehicle turning behavior control apparatus as recited in claim 2, wherein the controlling section is configured to make the predetermined time period longer as a state variable representing the vehicle turning behavior increases.

4. The vehicle turning behavior control apparatus as recited in claim 3, wherein the state variable representing the vehicle turning behavior is a lateral acceleration.

5. The vehicle turning behavior control apparatus as recited in claim 1, wherein the controlling section is configured to decrease the limit turning behavior as the modified steering speed becomes higher.

6. The vehicle turning behavior control apparatus as recited in claim 1, wherein the controlling section is configured to decrease the modified steering speed used for determining the limit turning behavior, at a predetermined time rate of change at the start of and after an end of the vehicle speed decrease for limiting the vehicle turning behavior to the limit turning behavior.

7. The vehicle turning behavior control apparatus as recited in claim 1, wherein the controlling section is configured to terminate the vehicle speed decrease for limiting the vehicle turning behavior to the limit turning behavior when a target vehicle speed to be used as a target in the vehicle speed decrease for limiting the vehicle turning behavior to the limit turning behavior becomes higher than a vehicle speed of the vehicle.

8. The vehicle turning behavior control apparatus as recited in claim 1, wherein the controlling section is configured to terminate the vehicle speed decrease for limiting the vehicle turning behavior to the limit turning behavior when a target deceleration to be used as a target in the vehicle speed decrease for limiting the vehicle turning behavior to the limit turning behavior becomes smaller than or equal to zero.

9. The vehicle turning behavior control apparatus as recited in claim 1, wherein the controlling section is configured to decrease the limit turning behavior corresponding to the modified steering speed as the vehicle speed of the vehicle becomes higher.

10. The vehicle turning behavior control apparatus as recited in claim 1, wherein the controlling section is configured to decrease the limit turning behavior corresponding to the modified steering speed as a steering angle becomes smaller.

11. A vehicle turning behavior control apparatus comprising:
a controlling section which is configured to determine an actual steering speed, to determine a limit turning behavior dependent on the actual steering speed, to produce a control signal in accordance with the limit turning behavior, to decrease a vehicle speed by controlling the vehicle speed in accordance with the control signal, and thereby to limit a vehicle turning behavior to the limit turning behavior, the controlling section being further configured to produce a signal representing a modified steering speed in accordance with the actual steering speed, and to modify the control signal in accordance with the modified steering speed, the controlling section being further configured to make the modified steering speed higher than the actual steering speed when the actual steering speed decreases during a turning steering in a steering amount increasing direction;
wherein the controlling section is configured to calculate, as the modified steering speed, a peak-hold turning steering speed which is increased with the actual steering speed so that the peak-hold turning steering speed remains equal to the actual steering speed while the actual steering speed is increasing during the turning steering, and which is held equal to a peak value which is the highest value of the actual steering speed before a decrease of the actual steering speed while the actual steering speed during the turning steering is decreasing, wherein the controlling section is configured to hold the peak-hold turning steering speed equal to the peak value until a start of the returning steering, and wherein the controlling section is further configured to determine, from the actual steering speed, a turning steering speed which is equal to the actual steering speed during the turning steering in the steering amount increasing direction and which is held equal to zero during the returning steering, to calculate the modified steering speed in accordance with the turning steering speed so that the modified steering speed is higher than the turning steering speed when the turning steering speed decreases during the turning steering, and to determine the limit turning behavior in accordance with the modified steering speed.

12. The vehicle turning behavior control apparatus as recited in claim 11, wherein the controlling section is configured to determine a target deceleration in accordance with the limit turning behavior, to control the vehicle speed by producing the control signal in accordance with the target deceleration, and thereby to limit the vehicle turning behavior to the limit turning behavior, the controlling section being configured to modify the target deceleration in accordance with the modified steering speed, and to control a vehicle driving/braking force by producing the control signal in accordance with the target deceleration.

13. A vehicle turning behavior control process comprising:

a first operation of determining an actual steering speed, determining a limit turning behavior dependent on the actual steering speed, producing a control signal in accordance with the limit turning behavior, decreasing a vehicle speed by controlling the vehicle speed in response to the control signal and limiting a vehicle turning behavior to the limit turning behavior, the vehicle turning behavior control process further comprising a second operation of producing a signal representing a modified steering speed in accordance with the actual steering speed, and modifying the control signal in accordance with the modified steering speed, in the second operation, the modified steering speed being made higher than the actual steering speed when the actual steering speed decreases during a turning steering in a steering amount increasing direction;

wherein the modified steering speed is increased with the actual steering speed so that the modified steering speed remains equal to the actual steering speed while the actual steering speed is increasing during the turning steering, and the modified steering speed is held equal to a peak value which is the highest value of the actual steering speed before a decrease of the actual steering speed while the actual steering speed during the turning steering is decreasing, and the modified steering speed is held equal to the peak value until a start of the returning steering, and wherein a turning steering speed is determined from the actual steering speed, the turning steering speed being equal to the actual steering speed during the turning steering in the steering amount increasing direction and being held equal to zero during the returning steering, the modified steering speed is calculated in accordance with the turning steering speed so that the modified steering speed is higher than the turning steering speed when the turning steering speed decreases during the turning steering in the steering amount increasing direction, and the limit turning behavior is determined in accordance with the modified steering speed.

14. The vehicle turning behavior control apparatus as recited in claim 1, wherein the controlling section is configured to calculate, as the modified steering speed, a peak-hold turning steering speed which is increased with the actual steering speed so that the peak-hold turning steering speed is equal to the actual steering speed while the actual steering speed is increasing during the turning steering, and which is held equal to a peak value which is the highest value of the actual steering speed before the decrease of the actual steering speed while the actual steering speed during the turning steering is decreasing, and the controlling section is configured to hold the peak-hold turning steering speed equal to the peak value until the start of the returning steering.

15. The vehicle turning behavior control apparatus as recited in claim 1, wherein the controlling section is configured to start a vehicle speed decrease control to decrease a vehicle speed when the vehicle turning behavior exceeds the limit turning behavior.

16. The vehicle turning behavior control apparatus as recited in claim 1, wherein the controlling section is configured to start a vehicle speed decrease control to decrease a vehicle speed when a lateral acceleration of the vehicle representing the vehicle turning behavior exceeds a limit lateral acceleration representing the limit turning behavior.

17. The vehicle turning behavior control apparatus as recited in claim 16, wherein the limit lateral acceleration is increased with increase in the steering speed.

18. The vehicle turning behavior control apparatus as recited in claim 1, wherein the controlling section is configured to discriminate a turning steering operation of turning a steering wheel of the vehicle away from a neutral position from a returning steering operation of turning the steering wheel toward the neutral position, to detect an instant of the start of the returning steering operation, and to hold the modified steering speed constantly equal to the highest value of the actual steering speed before the decrease of the actual steering speed while the actual steering speed during the turning steering is decreasing.

19. A vehicle turning behavior control apparatus comprising:

a controlling section to limit a vehicle turning behavior of a vehicle accompanying a steering operation, to a limit turning behavior corresponding to an actual steering speed of the steering operation, by a vehicle speed decrease, the controlling section being configured to determine, from the actual steering speed, a turning steering speed which is equal to the actual steering speed during a turning steering operation of turning a steering wheel of the vehicle away from a neutral position and which is held equal to zero during a returning steering operation of turning the steering wheel toward the neutral position, to determine a modified steering speed in accordance with the turning steering speed, and to determine the limit turning behavior in accordance with the modified steering speed, the controlling section being further configured to make the modified steering speed higher than the turning steering speed when the turning steering speed decreases during the turning steering operation.

20. The vehicle turning behavior control apparatus as recited in claim 19, wherein the controlling section is configured to calculate a product quantity of a steering angle and the actual steering speed which is a derivative of the steering angle, to set the turning steering speed equal to the actual steering speed when the product quantity is positive, and to set the turning steering speed equal to zero when the product quantity is negative.

* * * * *